US011415682B1

(12) United States Patent
Clark

(10) Patent No.: US 11,415,682 B1
(45) Date of Patent: Aug. 16, 2022

(54) LIDAR RECEIVER SYSTEM WITH AMBIENT-LIGHT COMPENSATION AND THRESHOLD ADJUSTMENT

(71) Applicant: Acuity Technologies, Inc., Menlo Park, CA (US)

(72) Inventor: Reece Robert Clark, Emerald Hills, CA (US)

(73) Assignee: Acuity Technologies, Inc., Menlo Park, CA (US)

( * ) Notice: Subject to any disclaimer, the term of this patent is extended or adjusted under 35 U.S.C. 154(b) by 716 days.

(21) Appl. No.: 16/233,020

(22) Filed: Dec. 26, 2018

Related U.S. Application Data

(60) Provisional application No. 62/708,899, filed on Dec. 26, 2017.

(51) Int. Cl.
*G01S 7/487* (2006.01)
*G01S 7/4861* (2020.01)
*G01S 7/497* (2006.01)

(52) U.S. Cl.
CPC .......... *G01S 7/4873* (2013.01); *G01S 7/4861* (2013.01); *G01S 7/497* (2013.01)

(58) Field of Classification Search
None
See application file for complete search history.

(56) References Cited

U.S. PATENT DOCUMENTS

| 2002/0036765 A1* | 3/2002 | McCaffrey | G01S 17/894 356/5.08 |
| 2005/0252062 A1* | 11/2005 | Scrogin | F41G 3/065 42/119 |
| 2018/0284245 A1* | 10/2018 | LaChapelle | G01S 17/42 |
| 2019/0049295 A1* | 2/2019 | Martinez | G01J 1/4257 |

* cited by examiner

*Primary Examiner* — Eric L Bolda
(74) *Attorney, Agent, or Firm* — Lathrop GPM LLP

(57) ABSTRACT

A lidar and optical rangefinder receiver improves signal detection in the presence of varying levels of environmental light and other noise sources. The occurrence of false triggers, due to noise, during periods when no optical pulse is emitted is used to adjust the pulse detection threshold level and simultaneously calibrate the time-of-flight timer. The photodetector's response to ambient light is also used to adjust the threshold level. Example systems include signal detection electronics with dynamic thresholding and real-time calibration of timing electronics, in which the threshold level for signal detection is adjusted in response to both information acquired during calibration cycles and ambient light measured between active rangefinding cycles.

20 Claims, 14 Drawing Sheets

LIDAR RECEIVER SYSTEM WITH AMBIENT-LIGHT COMPENSATION AND THRESHOLD ADJUSTMENT

RELATED APPLICATIONS

This application claims priority to U.S. Provisional Patent Application Ser. No. 62/708,899, filed Dec. 26, 2017, which is incorporated herein by reference.

BACKGROUND

Many optical rangefinding and lidar receivers include an optical detector that converts light to an electrical signal, AC coupling and amplification of the detector output, and a high-resolution timer that resolves a time-of-flight of an optical pulse emitted from an optical source and reflected by a target to the detector. The timer is typically started at pulse emission and stopped when a reflection is received. The timer output may then be used to compute the distance traveled by the light pulse.

In many implementations, the path of the emitted and reflected light is deflected by one or more scanning optics to sequentially illuminate small spots in a target scene. The beam deflection angle of the scanning optics at the time of each pulse emission is used to determine the direction of the optical pulse. Combining distance and direction information allows reconstruction of many scene points. This approach is implemented in many lidar products in a wide variety of scanning configurations, using many types of optical sources, detectors, and scanning optics. In most cases, the same optics are used for scanning both the outgoing light beam and the direction or field-of-view of the detector.

SUMMARY OF THE EMBODIMENTS

Effective signal detection rejects spurious inputs, such as those caused by detector noise and/or light other than from a reflected pulse (i.e., ambient light) while recognizing signals, sometimes small in amplitude in relation to the ambient light, from surfaces reflecting optical pulses from a source typically collocated with the receiver. Many lidar systems utilize a threshold to differentiate between a detected signal pulse and noise. This may be done with electronic hardware, firmware, and/or software-based signal processing. Since optical and detector noise will typically vary with environmental conditions, it is advantageous to adjust the threshold in response to variations in the conditions.

Though most ambient light can be filtered out in lidar systems, it may still be desirable to obtain measurements of the ambient light from each scene point. The ambient light level may affect the response time of the detector and signal amplification electronics, and may affect the level of noise outputted by the detector.

Many high-resolution timers cannot compensate for effects like aging, temperature drift, and supply voltage drift. In many lidar systems, there are intervals in which distance measurements are not taken. These intervals may be as short as a single distance measurement cycle. Calibration may be performed during these intervals by starting and stopping the timer with triggers separated by a precisely known time interval. The resulting count value(s) from the timer may then be used to adjust a parameter (e.g. supply voltage) that changes the timer count rate, or to compute a calibration factor that converts a timer count value into a time value.

Calibrating for slowly-changing factors, such as temperature change or component in-run drift and aging, may be done occasionally or gradually. Other factors change more rapidly, for example from one pulse measurement to the next. These include things such as changes in the reflected pulse amplitude and the level of ambient light entering the detector during the interval of potential pulse detection.

Embodiments herein advantageously improve signal detection of lidar and optical rangefinder receivers in the presence of ambient light and other noise sources that typically vary in time. Noise/background detection and system adjustment therefrom may be performed in two ways, which may be used separately or together.

A first aspect of the embodiments uses a measurement of the DC-coupled signal from the optical detector to adjust the threshold level of the receiver. It may be beneficial to use filtering and/or timing in the sampling of this signal to remove the response of the detector to optical pulses to be captured and timed. This may preferably be done by sampling the amplified signal at a time when signal pulses are not expected to be received, such as just before transmitting an optical pulse. The resulting signal may then be used to raise or lower the threshold accordingly.

One aspect of the embodiments is the realization that the total DC output of the detector may be used to compute the expected amplitude of the non-signal fluctuations expected to occur during the time interval until the next sample of the DC output. A noise component of ambient light generally scales as the square root of the ambient light intensity and becomes significant when the number of photons detected per unit time is relatively low. This is typically the case in optical rangefinding systems. Since only this component passes through the AC coupler prior to the threshold level comparison, a nonlinear amplifier is preferably used to obtain the final voltage used to set the threshold level. A comparison of the AC-coupled signal to the threshold level generates a logic signal transition when the AC-coupled signal rises above the threshold level.

Another aspect of the embodiments improves receiver performance utilizing measurements taken from the receiver's timing electronics during periods when an optical pulse is not detected by the system (i.e., an absence of light-pulse detection). The timer may be started with a signal from a precise interval generator rather than the output optical pulse. The timer stops either in response to a second signal at the end of the interval, or when the detector output due to ambient light or other noise source exceeds the present threshold level.

In an embodiment, after receiving one or more such timing results, each result is classified as a response to noise, a response to the end of the reference timing interval, or uncertain (possibly either). This classification is based on the timer count value when the stop trigger occurs. If the count value is within the range of values that are likely to result due to the end of the precision interval, the count value may be classified as a response to the end of the precision interval (i.e., a timeout count value). If the time is less than that, it may be classified as a response to a noise event. If the time count value is near the lower edge of possible values that might result from the end of the precision interval, it may be classified as uncertain.

Once one or more timer count values have been classified, the classified count values may be used in two ways. First, the number or fraction of count values due to noise events may be used adjust the threshold level at which the receiver stops the timer during subsequent rangefinding measurements. Second, the count values classified as timeout count values may be used to form calibration values used to calibrate timer results from range measurements. This enables adjustment of the threshold level to maintain good sensitivity to small signal pulses in the presence of multiple factors that would degrade the performance of a system without such adaptive thresholding, and also enables determination of calibration information which may vary with operating conditions over time.

In many lidar and rangefinding applications, the desired frequency of false range measurements due to noise is zero or extremely low, e.g., 1 per 10 million range samples. To maintain this level accurately would require many calibration cycles. In these cases, it may be desirable to apply a shift to the threshold during calibration in addition to adjustments made to maintain the desired fraction of noise triggers. For example, shifting the threshold down by a fixed value during calibration, adjusting the threshold to maintain a noise-trigger frequency of 1 cycle in 10, and then shifting the threshold back up for rangefinding, in addition to applying adjustments computed, can accomplish a low frequency of noise events during rangefinding.

This refinement, while somewhat less accurate than finding the desired threshold directly, results in many cases in the determination of a suitable threshold level in much less time than would be necessary without incorporating the threshold shift for calibration cycles. It has been found that the amplitude of the shift may be determined empirically and a fixed shift implemented such that the speed of threshold adjustment and level of threshold during range measurements are both satisfactory.

It will be appreciated that while both calibration and noise detection can be performed with the same set of timer count values, these processes can also be performed separately. It should also be appreciated that calibration cycles and the resulting classification of results can be used to adjust the threshold level even if the timer is intrinsically sufficiently accurate for the application and does not need a periodic calibration process.

Timer calibration information may be obtained without the need to classify pulses if a receiver contains means to ensure that noise triggers do not occur in cycles intended to be used only for obtaining timer calibration information. This may be ensured by, for example, changing the threshold to block all noise during calibration cycles, or by disabling the detector during these cycles. Then all measurements obtained reflect measurement of the precise reference time interval.

Similarly, for purposes of noise detection only, the threshold may be set to allow some cycles to stop from noise events. In this case it may be beneficial, but not necessary, to record the time measured by the timer. The knowledge of whether a noise event or a timeout occurred is sufficient to adjust the threshold effectively, although additional benefit can be obtained by using the time to each noise trigger. Shorter times indicate a higher likelihood per unit time of noise stopping the timer at the present threshold level.

It should be appreciated that if timer calibration is not needed, the high-resolution timer need not be present or used for adjusting the threshold level based on noise pulse information. For example, the frequency of noise triggers, or number of times the AC-coupled detector output transitions above the threshold level, during an interval in which signal pulses are not expected to be detected, can be used to adjust the threshold level.

In another embodiment, the output of the photodetector, with or without AC coupling, is converted into a sequence of digital samples at high frequency. Processing in software or digital hardware (e.g., programmable logic, ASIC, etc.) is then performed. In this embodiment, any or all of the functions of AC-coupling (filtering), comparison to a threshold level, and adjustment of the threshold level in response to the digitized detector signal is performed digitally.

The use of both methods described above—threshold adjustment in response to ambient light, and threshold adjustment in response to a relative number or frequency of noise triggers during calibration cycles—may provide greater benefit than can be obtained using either method alone. While the latter can eventually adjust the threshold appropriately to any steady state or slowly changing noise sources, ambient light frequently changes in the interval from one range cycle to the next, for example when scanning from a sunlit to a shaded surface. Conversely, the much faster correction using ambient light measurement cannot easily maintain the desired false trigger rate as well as the adjustment using the classification process and may not compensate adequately for other sources of noise such as temperature- and voltage-dependent detector dark noise.

This combined method adjusts the threshold level for both rapid changes and long-term or permanent changes in noise levels.

Embodiments herein may be applied generally, although details of the implementation will depend on the characteristics of the timer, the way it is triggered, and design choices such as whether to implement any portion in hardware, software, programmable logic, or integrated circuits, as well as the choice of electronic hardware used. For example, if the timer did not require period recalibration and were to always generate the same output for the precision time interval, the number of results classified as uncertain would be zero or small. Similarly, if the timer calibration drifts only slowly, then the results of preceding classifications can be used to guide the classification of subsequent results.

In one embodiment, a lidar and rangefinder receiver system includes a photodetector and a timer configured to start according to light-pulse emission from an optical source, and stop when an output of the photodetector exceeds a threshold. The receiver system also includes an ambient-light compensator configured to measure a background level of the photodetector and set the threshold according to the measured background level.

In another embodiment, a lidar and rangefinder receiver system includes a photodetector and a timer configured to generate one or more count values in an absence of light-pulse detection, each of the one or more count values indicative of a time interval between a start trigger and a stop trigger, the stop trigger resulting from one of a noise event and a timeout. The system also includes a calibrator configured to (a) identify a subset of noise count values, of the one or more count values, for which the stop trigger resulted from a noise event, and (b) set the threshold based on the subset noise count values.

In another embodiment, a lidar and rangefinder receiving method includes measuring a background level of a photodetector, setting a threshold according to the measured background level, starting a timer according to light-pulse emission from an optical source, and stopping the timer when an output of the photodetector exceeds the threshold.

In another embodiment, a lidar and rangefinder receiving method includes generating one or more count values with a timer in an absence of light-pulse detection, each of the one or more count values indicative of a time interval between a start trigger and a stop trigger, the stop trigger resulting from one of a noise event and a timeout. The method also includes identifying a subset of noise count values of the one or more count values, and setting the threshold based on the subset of noise count values.

In another embodiment, a lidar and rangefinder receiver system includes a photodetector, a comparator configured to issue output signals when the photodetector output exceeds a threshold, and an ambient-light compensator configured to measure a background level of the photodetector and set the threshold according to the measured background level.

In another embodiment, a lidar and rangefinder receiver system includes a photodetector, a comparator configured to issue output signals when the photodetector output exceeds a threshold, and a calibrator configured to (a) identify one of more of the output signals as noise events, and (b) adjust the threshold based on one of a number and rate of the noise events.

DETAILED DESCRIPTION OF THE EMBODIMENTS

Figure 1:
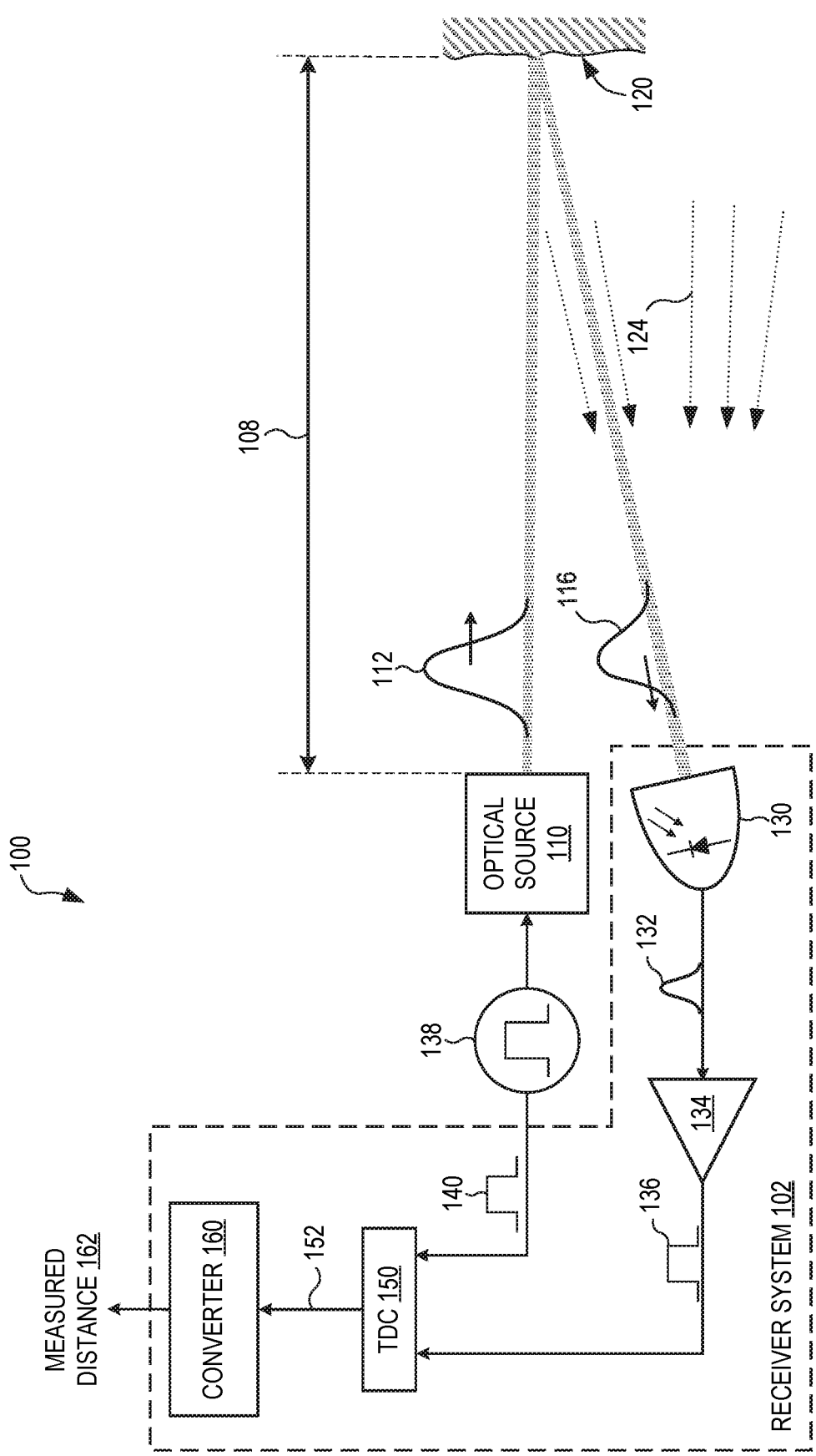
FIG. 1 shows one example of an optical rangefinder with which embodiments presented herein may be used.

FIG. 1 shows one example of an optical rangefinder 100 with which embodiments presented herein may be used. Optical rangefinder 100 measures a distance 108 between optical rangefinder 100 and a target 120 by emitting a light pulse 112 toward surface 120 and measuring a reflected light pulse 116 produced when light pulse 112 reflects and/or scatters off target 120. Rangefinder 100 includes an optical source 110 that emits light pulse 112 when triggered by a pulse generator 138. Optical source 110 may include a pulsed laser, externally-modulated continuous light source, modulated lamp, or another type of triggerable, pulsed light source.

Optical rangefinder 100 includes a receiver system 102 that measures time-of-flight (TOF) between the emission of light pulse 112 from optical source 110, and the detection of reflected light pulse 116 on a photodetector 130. To measure the TOF, a start trigger 140 from pulse generator 138 starts a timer circuit, shown in FIG. 1 as a time-to-digital converter (TDC) 150. Photodetector 130 outputs a photodetector signal 132 in response to detecting reflected light pulse 116, and a signal conditioning circuit 134 converts photodetector signal 132 into a stop trigger 136 that stops TDC 150. After receiving stop trigger 136, TDC 150 outputs a count value 152 accumulated by TDC 150 between start trigger 140 and stop trigger 136. A converter 160 divides count value 152 from TDC 150 by a count speed to convert count value 152 into the TOF (e.g., in units of seconds). Converter 160 may also multiply the TOF by a conversion factor (e.g., one-half the speed of light) to convert the TOF into a measured distance 162 (i.e., in units of meters) corresponding to distance 108.

In one example, optical rangefinder 100 functions as a lidar receiver system that cooperates with motors, optics, and/or other components to form a lidar system that measures a plurality of distances to a plurality of targets. The lidar system steers emitted light pulses (e.g., emitted light pulse 112) in different directions to illuminate the plurality of targets with the emitted light pulses and measure the distances thereto. Values of measured distance 162 may then be stored in memory and correlated with the directions of the emitted light pulses to produce a three-dimensional mapping of the targets.

Figure 2:
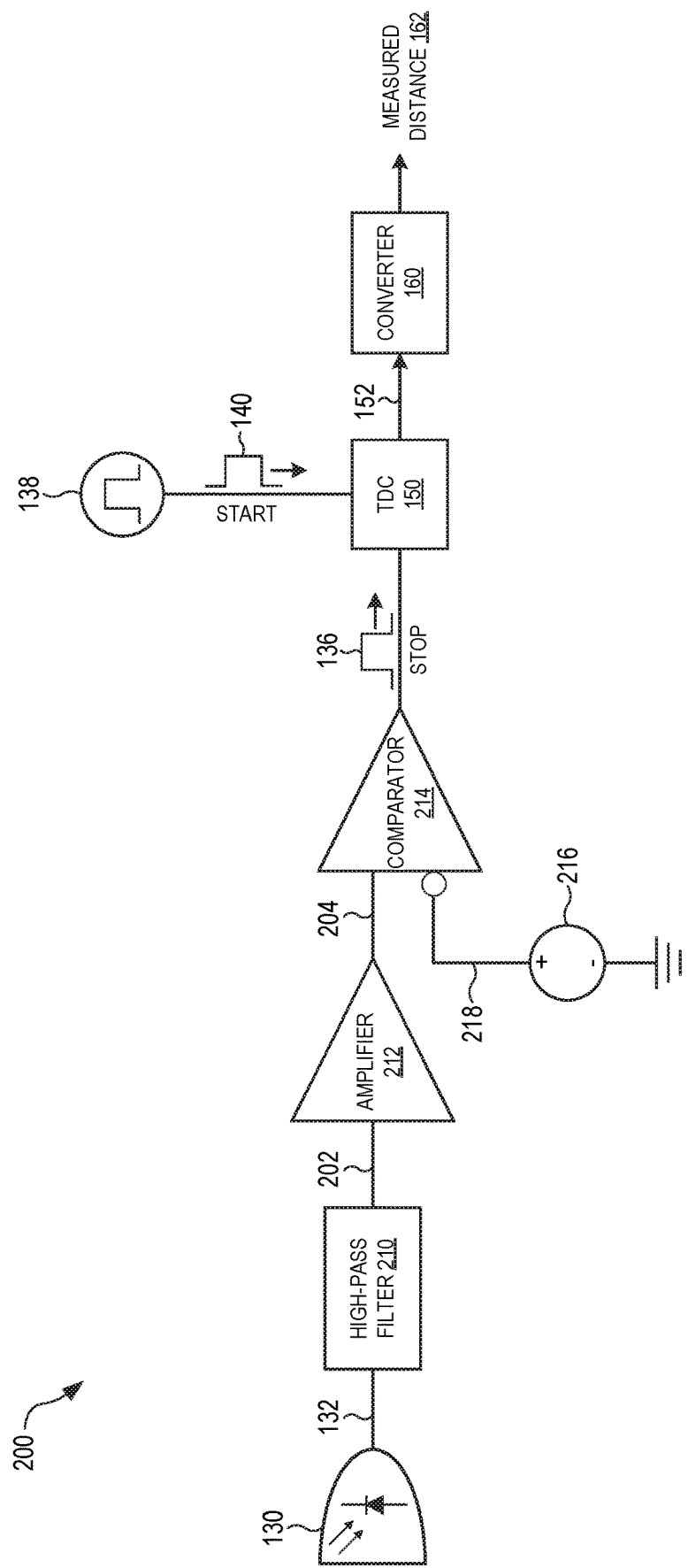
FIG. 2 is a functional diagram of an optical rangefinder and lidar receiver system that is one example of a receiver system of the optical rangefinder of FIG. 1, in an embodiment.

FIG. 2 is a functional diagram of an optical rangefinder and lidar receiver system 200 that is one example of receiver system 102 of FIG. 1. In FIG. 2, a high-pass filter 210 blocks DC and low-frequency components of photodetector signal 132 while allowing high-frequency components of photodetector signal 132 to pass as an AC signal 202. An amplifier 212 amplifies AC signal 202 into amplified AC signal 204, and a comparator 214 compares amplified AC signal 204 to a threshold 218. In the example of FIG. 2, threshold 218 is generated by a voltage source 216. When amplified AC signal 204 is greater than threshold 218, comparator 214 changes output states, producing stop trigger 136 to stop TDC 150. The two output states of comparator 214 may be chosen for compatibility with triggering of TDC 150 (e.g., TTL, CMOS, ECL, etc.). High-pass filter 210, amplifier 212, comparator 214, and voltage source 216 are collectively one example of signal conditioning circuit 134 of FIG. 1.

When reflected light pulse 116 is detected by photodetector 130, photodetector signal 132 will include an electronic representation of reflected light pulse 116, and a leading edge of the electronic representation will pass through high-pass filter 210, be amplified by amplifier 212, and cause comparator 214 to change output states if the electronic representation has a large enough amplitude. For comparator 214 to change output states, threshold 218 must be set low enough that the electronic representation causes amplified AC signal 204 to exceed threshold 218.

It is assumed herein that photodetector signal 132 increases (e.g., in voltage) with an intensity of light detected by photodetector 130, and that all amplifiers are non-inverting. Thus, when threshold 218 is lowered (e.g., voltage source 216 outputs a lower voltage as threshold 218), a lower intensity of light detected by photodetector 130 may cause comparator 214 to change output states, and when threshold 218 is raised (e.g., voltage source 216 outputs a higher voltage as threshold 218), a higher intensity of light detected by photodetector 130 may cause comparator 214 to change output states. However, in general, any of the signals and triggers described herein may be differential, or of any polarity. It will be apparent to one trained in the art how embodiments herein may be configured (e.g., switching the two inputs of comparator 214, inverting one or more signals, etc.) based on signal and trigger polarities different from those presented herein.

Embodiments herein advantageously adjust threshold 218 to optimize a trade-off between two effects. In the first effect, threshold 218 is set too low, wherein a noise of amplified AC signal 204 may cause amplified AC signal 204 to momentarily exceed threshold 218, in turn causing comparator 214 to prematurely change output states, stop TDC 150, and produce an erroneous value of measured distance 162 that is less than distance 108. Alternatively, when target 120 is either absent or too distant to produce reflected light pulse 116 that is detectable by photodetector 130, receiver system 102 may output an erroneous value of measured distance 162 instead of indicating that target 120 is absent. One occurrence of premature stopping of TDC 150 to the noise component is referred to herein as a "noise event."

In the second effect, threshold 218 is set too high, preventing comparator 214 from responding to reflected light pulse 116 when detected by photodetector 130. This prevents ranging of a target that is highly absorptive of emitted light pulse 112. Furthermore, since an intensity of reflected light pulse 116 typically scales inversely with distance 108, a value of threshold 218 that is too high may result in receiver system 200 working correctly only for an unacceptably small range of distance 108.

Embodiments herein steer threshold 218 toward an optimal value for which the probability of a noise event prematurely stopping TDC 150 equals a predefined probability acceptable for rangefinding (e.g., one noise event per million light pulses). The probability of a noise event changes with a magnitude of the noise of amplified AC signal 204, and thus threshold 218 may be lowered, when the noise is relatively low, to increase sensitivity to a weaker reflected light pulse 116. At other times, when the noise is relatively high, threshold 218 may be increased to lower the probability of a noise event prematurely stopping TDC 150.

To appreciate how the noise of amplified AC signal 204 may change over time, amplified AC signal 204 may be considered as having four components: (1) reflected light pulse 116 detected by photodetector 130; (2) ambient light 124 detected by photodetector 130; (3) dark current generated by photodetector 130 (e.g., due to thermionic emission); and (4) noise, offsets, and pick-up originating in electronics after the light-sensing element of photodetector 130 (e.g., voltage and current noises from amplifier inputs, Johnson noise from resistors, etc.). While high-pass filter 210 blocks the DC and low-frequency (e.g., less than 500 MHz) portions of photodetector signal 132, frequency noise above a cut-off frequency of high-pass filter 210 will pass through high-pass filter 210 and contribute to noise events. For example, high-pass filter 210 may be configured to block the dark current generated by photodetector 130. However, shot noise of the dark current, which is a white noise, will be spread over some frequencies that pass through high-pass filter 210. As the magnitude of the shot noise scales as the square-root of the dark current, a time variation of the dark current (e.g., with temperature drift of photodetector 130, or drift of the voltage biasing the light-sensitive element) causes the magnitude of the corresponding shot noise to also change.

In many situations, a shot noise of ambient light 124 is the dominant noise contributor to amplified AC signal 204. In FIG. 1, photodetector 130 is shown detecting ambient light 124 along with reflected light pulse 116. Although not shown in FIG. 1, one or more lenses, apertures, filters (e.g., colored glass or acrylic, interference filters, etc.), and/or other components may be placed in front of photodetector 130 to transmit reflected light pulse 116 while blocking ambient light 124. Nevertheless, these additional components are not perfect, and some ambient light 124 may still be detected by photodetector 130. Like the previous example of dark noise, high-pass filter 210 blocks the DC and low-frequency portions of photodetector signal 132 due to ambient light. However, the shot noise of ambient light 124 will be spread over some frequencies that pass through high-pass filter 210 and contribute to noise events.

The shot noise of ambient light 124 increases as the square-root of an intensity of ambient light 124. The intensity of ambient light 124 may change with time, such as when optical rangefinder 100 goes from detecting target 120 in direct sunlight to detecting target 120 in a shadow. The corresponding shot noise of ambient light 124, and the resulting noise of amplified AC signal 204, will also change with time accordingly. Thus, as the intensity of ambient light 124 is reduced, threshold 218 may be lowered so that comparator 214 is more sensitive to a lower-intensity reflected light pulse 116. Similarly, when the intensity of ambient light 124 increases, threshold 218 may be increased to prevent the corresponding increase in shot noise from contributing to noise events.

Photodetector 130 detects reflected light pulse 116 quickly enough to accurately reproduce reflected light pulse 116 as photodetector signal 132. For example, photodetector 130 may have a response time of 1 ns or less. In FIGS. 1 and 2, photodetector 130 is shown with a photodiode that outputs a photocurrent in response to light sensed thereon. However, photodetector 130 may use another type of light-sensing element, such as an avalanche photodiode, silicon photomultiplier, or photomultiplier tube. When the light-sensing element outputs a photocurrent in response to sensed light, photodetector 130 may include a transimpedance circuit that converts the photocurrent to a voltage to generate electronic signal 132. The transimpedance circuit may be resistor connected to ground, an active transimpedance amplifier, or any other circuit known in the art to convert the photocurrent into a corresponding voltage. Photodetector 130 may also include a voltage source for biasing the light-sensing element. For example, the voltage source may be a battery when the light-sensing element is a photodiode, or a high-voltage source when the light-sensing element is an avalanche photodiode, silicon photomultiplier, or photomultiplier tube.

In addition to changing levels of ambient light 124, embodiments herein may also compensate threshold 218 in response to time variation of several parameters of receiver system 102, such as parameters that drift or change with temperature. These time-varying parameters change electronic noise contributions to electronic signal 132. Examples of such time-varying parameters include the gain of photodetector 130 (e.g., responsivity of the light-sensitive element, transimpedance gain, biasing, etc.), Johnson noise of resistors, amplifier input noise, amplifier offsets occurring after high-pass filter 202 (e.g., offset voltages originating in comparator 214), the cut-off frequency and/or residual attenuation of high-pass filter 210, and supply voltage variations.

Ambient Light Compensation

Figure 3:
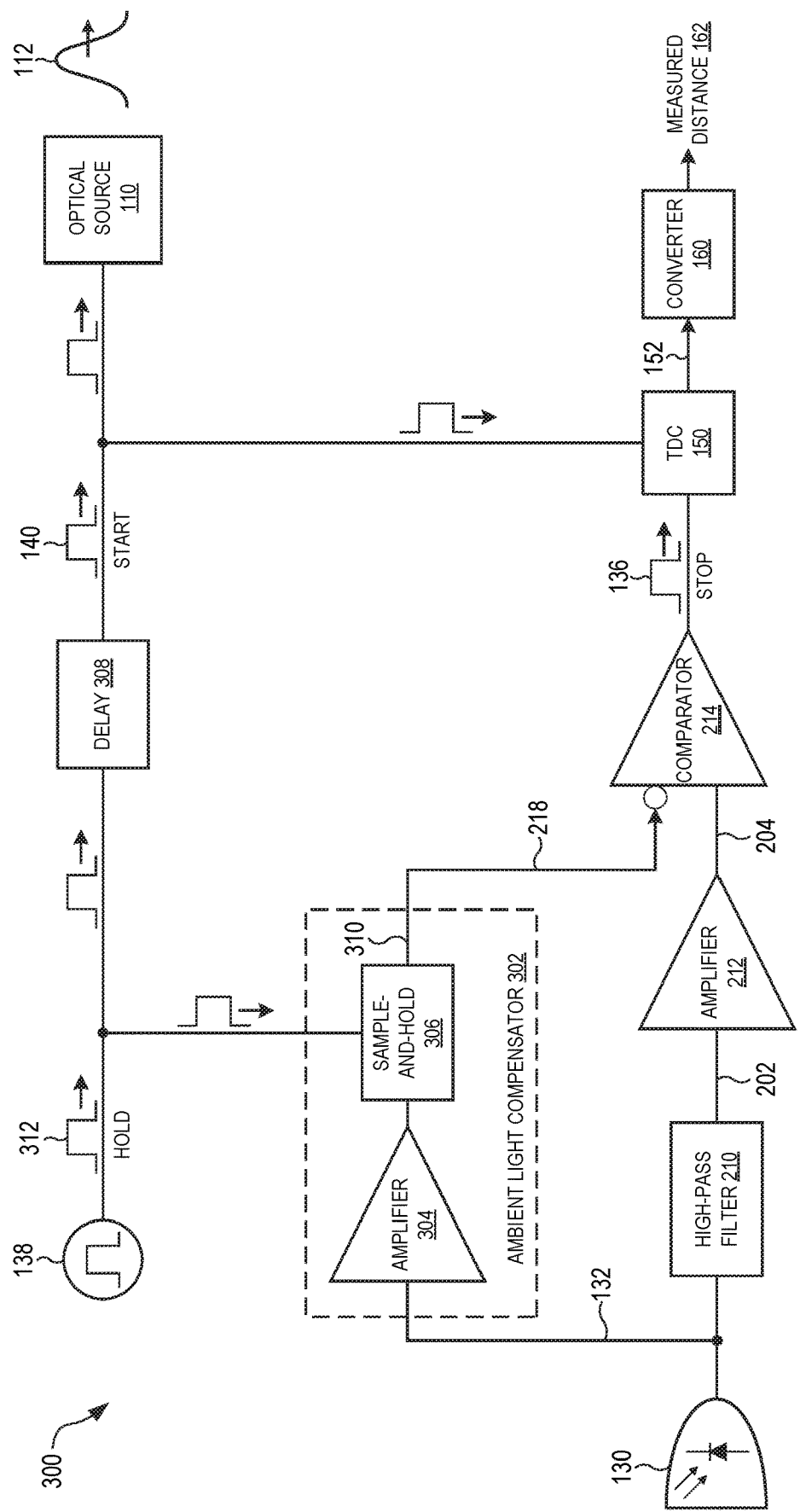
FIG. 3 is a functional diagram of one example optical rangefinder and lidar receiver system that uses an ambient-light compensator to set a threshold according to a background level, in an embodiment.

FIG. 3 is a functional diagram of one example optical rangefinder and lidar receiver system 300 that uses an ambient-light compensator 302 to set threshold 218 according to a background level. Receiver system 300 is one example of receiver system 102 of FIG. 1. Ambient-light compensator 302 samples photodetector signal 132 when photodetector 132 is not detecting light-pulse emission (e.g., emitted light pulse 112 and/or reflected light pulse 116) from optical source 110. Thus, ambient light detector 302 measures photodetector signal 132 as the background level containing contributions from ambient light 124 and photodetector 130, and not reflected light pulse 116. An amplifier 304 amplifies the background level, and a sample-and-hold circuit 306 tracks the amplified background level when in a tracking mode determined by a hold trigger 312. During a time when reflected light pulse 116 will not be detected by photodetector 130, hold trigger 312 changes state, causing sample-and-hold circuit 306 to enter a hold mode during which sample-and-hold circuit 306 stores a sample 310 of the amplified background level and sets threshold 218 according to sample 310. For example, sample-and-hold circuit 306 may output sample 310 directly as threshold 218, as shown in FIG. 3. Alternatively, a constant may be added to sample 310 such that a sum of the constant and sample 310 forms threshold 218.

In embodiments, amplifier 304 is a nonlinear amplifier whose output, for example, scales as the square-root of its input (i.e., amplifier 304 is a square-root amplifier), thereby increasing threshold 218 similarly to a shot-noise contribution to the background level. This embodiment may be used when the noise of photodetector signal 132 is dominated by shot noise, such as the shot noise of detected ambient light 124 and/or the shot noise of the dark current of photodetector 130. Square-root amplifier 304 may implement an approximation to "true" square-root amplification (e.g., with a piecewise linear amplification) with slight performance degradation.

FIG. 3 also shows a delay circuit 308 that generates start trigger 140 from hold trigger 312 with a delay. While FIG. 3 shows hold trigger 312 being generated by pulse generator 138, hold trigger 312 may be generated by another circuit capable of outputting a suitable trigger for controlling sample-and-hold circuit 306 and delay circuit 308. Start trigger 140 controls optical source 110 and TDC 150 concurrently. More specifically, start trigger 140 starts TDC 150 while a leading edge of light pulse 112 is emitted from optical source 110. The delay of delay circuit 308 is chosen such that sample-and-hold circuit 306 is fully in hold mode (i.e., storing and outputting sample 310 of the background level) while photodetector 130 detects reflected light pulse 116.

In embodiments, each of amplifier 304 and sample-and-hold circuit 306 is fast enough (e.g., as determined by a slew rate and/or small-signal bandwidth) to recover from a signal pulse before sample-and-hold circuit 306 fully enters the hold mode. However, when each of amplifier 304 and sample-and-hold circuit 306 is faster than this, amplifier 304 and sample-and-hold circuit 306 pass higher-frequency noise from photodetector 132 (e.g., shot noise of ambient light 124) to threshold 218, disadvantageously causing threshold 218 to vary excessively from one sample to the next such that comparator 214 misses valid signal pulses (when threshold 218 fluctuates upward) and generates excess noise events (when threshold 218 fluctuates downward). Thus, in these embodiments, ambient-light compensator 302 is fast enough to respond to changes in the background level and measure these changes in the absence of reflected light pulse 116, such as between subsequently emitted light pulses. These embodiments may be advantageously used with a lidar system that scans across a target partially in sunlight and partially in a shadow. For example, when the lidar system emits a first light pulse 112 toward a first portion of the target that is in sunlight, photodetector 130 will sense a relatively large amount of ambient light 116, producing a high background level. The lidar system may then emit a subsequent second light pulse 112 toward a second portion of the target that is in the shadow; photodetector 130 will then sense a relatively small amount of ambient light, producing a low background level. The time between first and second light pulses may be 100 ns or less.

In other embodiments, ambient-light compensator 302 operates continuously to measure the background level and update threshold 218 according to the measured background level. In these embodiments, ambient-light compensator 302 may include an amplifier that operates slower than photodetector 130, thereby low-pass-filtering the detected signal pulses. Ambient-light compensator 302 may then set threshold 218 according to the low-pass-filtered background level outputted by the amplifier. The low-pass-filtering implemented with the amplifier may be due to an intrinsic speed limit of the amplifier, or determined externally via amplifier feedback or a low-pass filter. In these embodiments, ambient light compensator 302 may advantageously operate continuously (i.e., when photodetector 130 both detects and does not detect reflected light pulse 116) to attenuate the detected light pulses. Thus, these embodiments differ from the example of FIG. 3, where sample-and-hold circuit 306 operates discretely with time to sample the background level only when photodetector 130 does not detect reflected light pulse 116 (e.g., in an absence of light-pulse emission from optical source 110).

While FIG. 3 shows ambient-light compensator 302, and other components of receiver system 300, implemented with analog components, ambient light-compensator 302 may be implemented as a digital ambient-light compensator with a high-speed (e.g., 1 Gbps or greater sampling rate) analog-to-digital converter (ADC) that digitizes photodetector signal 132. Sample-and-hold circuit 306 may be implemented digitally, such as with a microprocessor or field-programmable gate array (FPGA) that processes the digital values (e.g., nonlinearly transforms, low-pass filters, etc.) outputted by the high-speed ADC. A digital-to-analog converter (DAC) may then output an analog signal representative of the processed digital values as threshold 218. In other embodiments, high-pass filter 210, amplifier 212, and/or comparator 214 are implemented digitally, wherein comparator 214 compares a first digital value corresponding to amplified AC signal 204 and a second digital value outputted by the digital ambient-light compensator. In these embodiments, only one ADC is needed to digitize photodetector signal 132 and provide the resulting digital signal to both the digital high-pass filter and the digital ambient-light compensator.

Embodiments for which sample-and-hold circuit 306 operates discretely with time measure the background level when photodetector 130 is not detecting light-pulse emission from optical source 110. Due to the time-of-flight of emitted light pulse 112 (i.e., the time between emission of light pulse 112 from optical source 110 and the detection of reflected light pulse 116 by photodetector 116), times when photodetector 130 is not detecting light-pulse emission from optical source 110 may be different from times when optical source 110 emits light pulses. For example, in FIG. 1 photodetector 130 is oriented to detect light-pulse emission from optical source 110 as reflected light pulse 116, and thus sample-and-hold circuit 306 is timed (e.g., via hold trigger 112) to measure the background level when photodetector 130 is not detecting reflected light pulse 116, e.g., before optical source 110 emits light pulse 112, after optical source 110 emits light pulse 112 but before photodetector 130 begins detecting reflected light pulse 116, or after photodetector 130 has finished detecting reflected light pulse 116.

Photodetector may be oriented differently than shown in FIG. 1. For example, photodetector 130 may be positioned away optical source 110, in which case photodetector 130 may detect light-pulse emission from optical source 110 as emitted light pulse 112. In this example, sample-and-hold circuit 306 is controlled (e.g., via hold trigger 112) to measure the background level when photodetector 130 is not detecting emitted light pulse 112, e.g., before optical source 110 emits light pulse 112, or during the TOF after optical source 110 emits light pulse 112 and before photodetector 130 begins detecting emitted light pulse 112. In another example, some of emitted light pulse 112 may scatter off components (e.g., apertures, prisms, mirrors, etc.) proximate to optical source 110. In this example, sample-and-hold circuit 306 is controlled (e.g., via hold trigger 112) to measure the background level when photodetector 130 is detecting neither the scatter from emitted light pulse 112 nor reflected light pulse 116, e.g., before optical source 110 emits light pulse 112, after optical source 110 emits light pulse 112 but before photodetector 130 begins detecting the scatter of emitted light pulse 112 and reflected light pulse 116, after photodetector 130 has finished detecting the scatter of emitted light pulse 112 but before photodetector 130 has started detecting reflected light pulse 116, or after photodetector 130 has finished detected both the scatter of emitted light pulse 112 and reflected light pulse 116.

In some embodiments, receiver system 300 includes a timing circuit that controls sample-and-hold circuit 306 to (i) obtain sample 310 when photodetector 130 does not detect the light-pulse emission (e.g., reflected light pulse 116 and/or emitted light pulse 112), and (ii) output stored sample 310 while photodetector 130 detects the light-pulse emission. In FIG. 3, pulse generator 138 and delay 308 cooperate to form one example of the timing circuit. The timing circuit may also control the light-pulse emission from optical source 110. For example, in FIG. 3 start pulse 140 concurrently starts TDC 150 and triggers optical source 110 to emit light pulse 112. However, the timing circuit may be configured differently. For example, the timing circuit may be configured to start TDC 150 prior to triggering optical source 110, or after triggering optical source 110. While FIG. 3 shows delay 308 forming start trigger 140 such that TDC 150 starts after sample-and-hold circuit 306 has obtained sample 310, the timing circuit may be alternatively configured to start TDC 150 before sample-and-hold circuit 306 has obtained sample 310 (provided that photodetector 130 will not detect reflected light pulse 116 before sample-and-hold circuit 306 has obtained sample 310).

Calibration and Threshold Adjustment

Figure 4:
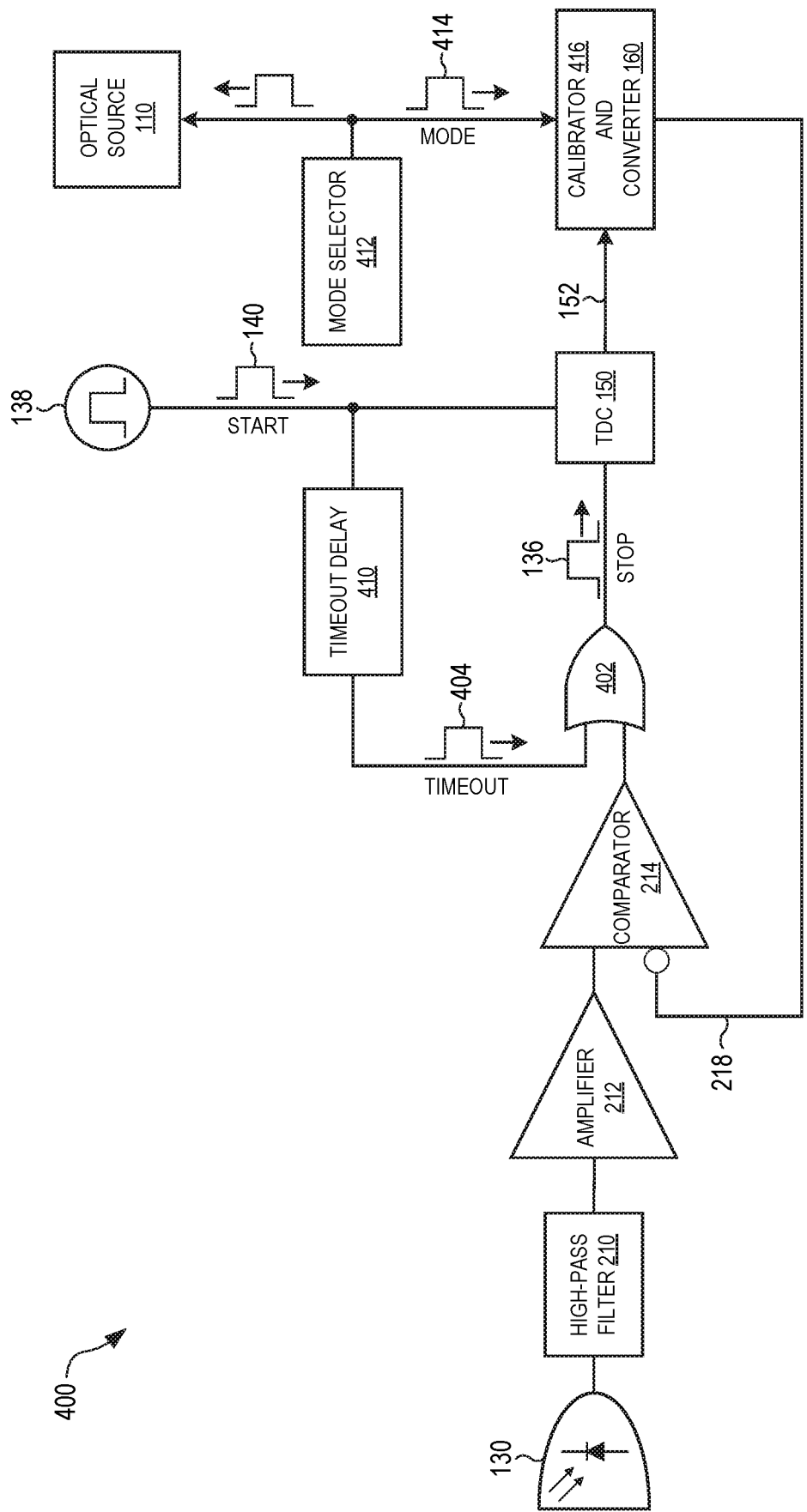
FIG. 4 is a functional diagram of one example lidar and optical rangefinder receiver system that uses a calibrator to set the threshold and determine a count speed with which a converter converts any count value from a time-to-digital converter (TDC) into a corresponding time-of-flight, in an embodiment.

FIG. 4 is a functional diagram of one example lidar and optical rangefinder receiver system 400 that uses a calibrator 416 to set threshold 218 and determine the count speed with which converter 160 converts count value 152 into a corresponding TOF. Calibrator 416 receives from TDC 150 one or more count values 152 generated when photodetector 130 is not detecting light-pulse emission from optical source 110. Calibrator 416 then uses count values 152 to set threshold 218 according to a desired probability of a noise event. As described in more detail below, calibrator 416 may be configured to use information regarding the measured frequency and/or fraction of noise triggers to implement any of several types of statistical analysis with count values 152, and can therefore obtain a more optimal value of threshold 218 as compared to ambient-light compensator 302 of FIG. 3. However, calibrator 416 may require several count values 152, which in turn requires an extended absence of light-pulse. In these cases, calibrator 416 cannot adjust and/or set threshold 218 as quickly as ambient-light compensator 302 (i.e., between subsequent emitted light pulses 112).

In the example of FIG. 4, receiver system 400 includes a timeout delay circuit 410 that generates a timeout trigger 404 from start trigger 140 with a timeout delay. An OR gate 402 combines the output of comparator 214 and timeout trigger 404 to produce stop trigger 136. Thus, there are two conditions that may stop TDC 150: a change in the output state of comparator 214 due to a noise event, and a timeout condition. Each time that TDC 150 measures and outputs one count value 152 may be referred to herein as a "calibration cycle." One or more calibration cycles performed continuously (i.e., without interspersed active rangefinding measurements) may be referred to herein as a "calibration period."

Timeout delay circuit 410 may be a digital delay generator that generates timeout trigger 404 with low jitter, or another type of timing circuit capable of generating timeout trigger 404 delayed with respect to start trigger 140. Alternatively, timeout delay circuit 410 may form part of a microcontroller, FPGA, SoC, or similar type of processor that outputs start trigger 140 and timeout trigger 404, wherein timeout trigger 404 is delayed from start trigger 140 by the timeout delay.

In one embodiment, receiver system 400 includes a mode selector 412 that directs receiver system 400 to operate according to one of two modes: a calibration mode and a rangefinding mode. As shown in FIG. 4, mode selector 412 outputs a mode trigger 414 to signal to calibrator 416 that receiver system 400 is in the calibration mode, and that calibrator 416 may therefore execute a calibration period to update threshold 218 and calibration values (e.g., the count speed). Mode trigger 414 may also simultaneously control optical source 110 to stop light-pulse emission from optical source 110 during calibration mode, or cause the emission to be blocked externally, or otherwise preclude detection. Thus, mode selector 412 indicates to calibrator 416 the extended absence (i.e., one or more pulse cycles) of light-pulse emission from optical source 110, during which calibrator 416 may obtain from TDC 150 the one or more count values 152. Mode selector 412, may be, for example, a logic gate that outputs mode trigger 414 as one of a first logic level to indicate the calibration mode, and a complementary second logic level to indicate the rangefinding mode (i.e., that calibrator 416 should not perform calibration due to light-pulse emission from optical source 110). When mode trigger 414 indicates the rangefinding mode, converter 160 operates to convert each count value 152 from TDC 150 to a corresponding TOF, and additionally to a corresponding measured distance 162, as described previously. In one embodiment (not shown in FIG. 4), calibrator 416 communicates to mode selector 412 when a calibration period is in process so that mode selector 412 does not switch to the rangefinding mode until calibrator 416 has completed the calibration period.

FIG. 4 shows calibrator 416 and converter 160 implemented as one element, which advantageously simplifies communication with TDC 150 since calibrator 416 and converter 160 both use mode trigger 414 and count values 152 from TDC 150. However, calibrator 416 and converter 160 may be implemented as separate elements, each independently receiving the same mode trigger 414 and count values 152. When implemented separately, calibrator 416 may communicate to converter 160 an updated value of count speed at the end of a calibration period.

Figure 5:
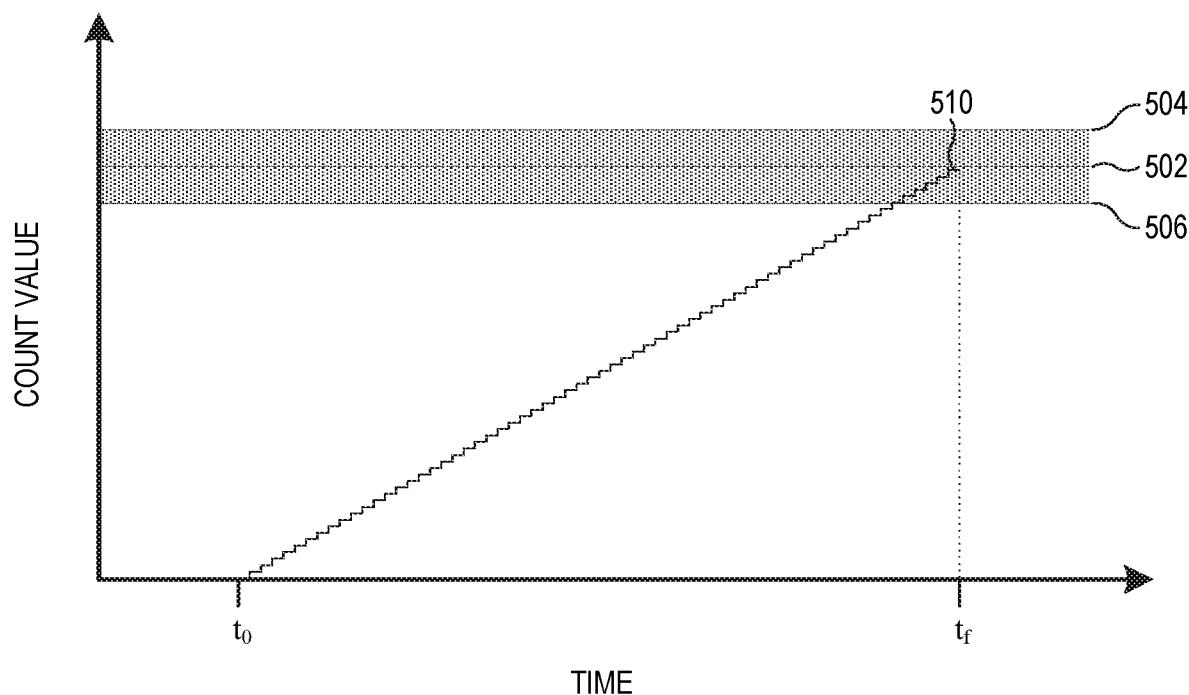
FIGS. 5 and 6 show how the TDC of FIG. 4 increases count value between a start time $t_0$ and a stop time $t_f$, illustrating one example of how the calibrator of FIG. 4 may classify a count value as a response to a noise event or a timeout, in embodiments.
Figure 6:
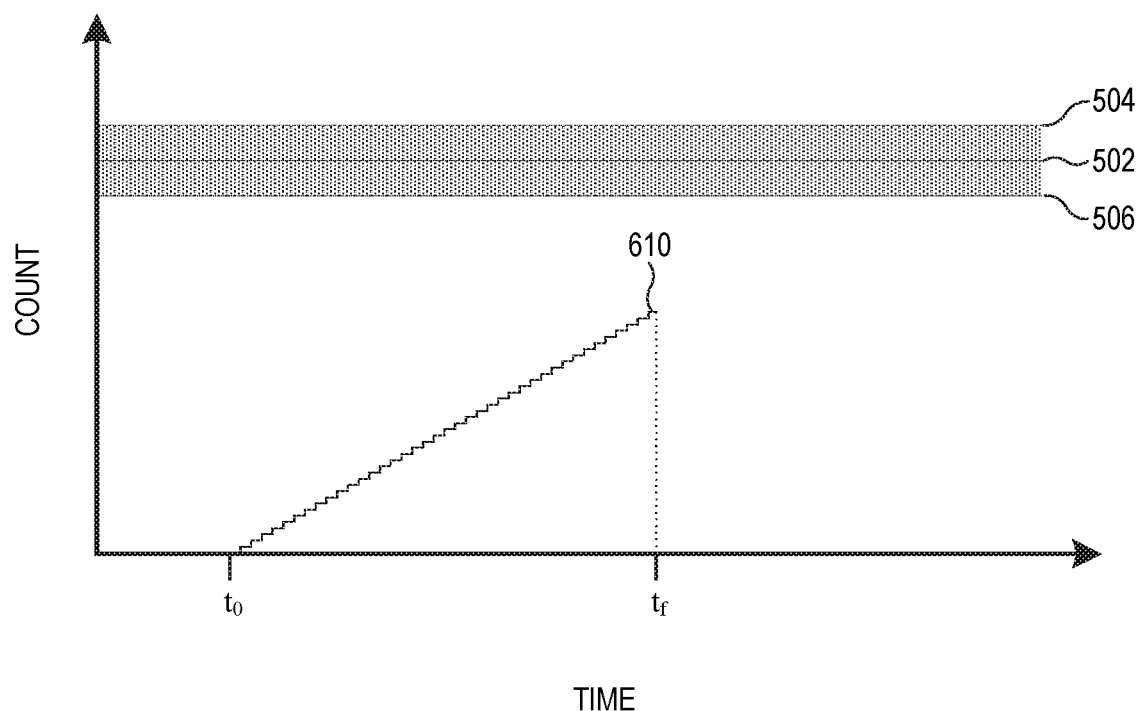

FIGS. 5 and 6 show how TDC 150 increases count value between a start time $t_0$ and a stop time $t_f$, illustrating one example of how calibrator 416 may classify a count value as a response to a noise event or a timeout. When TDC 150 receives start trigger 140, TDC 150 begins counting at the count speed, starting from an initial value of 0. When TDC 150 receives stop trigger 136, TDC 150 stops counting and outputs the final count value accumulated in a time interval between start trigger 140 and stop trigger 136.

In FIG. 5, the count value is shown reaching a final count value 510 close to a mean timeout count value 502, which is higher than a lower timeout limit 506. TDC 150 outputs final count value 510 to calibrator 416, which determines that final count value 510 corresponds to a timeout because final count value 510 is greater than lower timeout limit 506. A count value classified by calibrator 416 as originating from a timeout is referred to herein as a "timeout count value." Thus, count value 510 of FIG. 5 is one example of a timeout count value.

In FIG. 6, a noise event prematurely stopped TDC 150, rather than a timeout. In this case, a final count value 610 is less than lower timeout limit 506. TDC 150 outputs final count value 610 to calibrator 416, which determines that final count value 610 corresponds to a noise event because final count value 610 is less than lower timeout limit 506. A count value classified by calibrator 416 as originating from a noise event is referred to herein as a "noise count value." Thus, count value 610 of FIG. 6 is one example of a noise count value.

During a first calibration period, calibrator 416 selects an initial value for lower timeout limit 506, with which calibrator 416 classifies each of the count values 152 received from TDC 150 as a noise count value, timeout count value, or neither. Calibrator 416 calculates a mean of the timeout count values to generate mean timeout count value 502, and communicates mean timeout count value 502 to converter 160 as the count speed. Calibrator 416 may then update lower timeout limit 506 according to mean timeout count value 502. In one of these embodiments, calibrator 416 sets lower timeout limit 506 a fixed value below mean timeout count value 502. In another of these embodiments, calibrator 416 calculates a standard deviation of the timeout count values, and sets lower timeout limit 506 below mean timeout count value 502 by a multiple of the standard deviation (e.g., 1a, 2a, 3a, etc.) and/or a fraction thereof (e.g., 2.5a).

After calibrator 416 updates mean timeout count value 502 and/or lower timeout limit 506, calibrator 416 may then perform a second calibration period by obtaining a new set of count values 152, classifying the new set of count values 152, and updating timeout count value 502 and/or lower timeout limit 506 according to the new timeout count values. With each calibration period, mean timeout count value 502 and/or lower timeout limit 506 iteratively converge to accurate values. Therefore, periodically performing a calibration period helps correct mean timeout count value 502 and/or lower timeout limit 506 for drifts that may reduce an accuracy of measured distance 162.

Count value 152 may be close enough to lower timeout limit 506 that it is not clear whether it originates from a noise event or a timeout. In other words, a count value slightly less than lower timeout limit 506 may be a timeout count value (and vice versa), even though calibrator 416 classifies it as a noise count value. Incorrectly classifying this count value as a noise count value is equivalent to rejecting a low-lying outlier of the timeout count values, which will skew mean timeout count value 502 upward and result in a value of the count speed that is too high.

To reduce skew, calibrator 416 may also define an upper timeout limit 504 equidistant from mean timeout count value 502 as lower timeout limit 506. When count value 152 is greater than upper timeout limit 504, calibrator 416 classifies count value 152 as neither a timeout count value nor a noise count value. Calibrator 416 may disregard such high-lying outliers from calculations of mean timeout count value 502. Rejecting statistically equal numbers of high-lying and low-lying outliers of timeout count values minimizes the skew of mean timeout count value 502, preventing the count speed from being erroneously high.

To update threshold 218 during a calibration period, calibrator 416 may calculate a fraction of the count values that are noise count values, and compare the fraction to a target fraction. If the calculated fraction is greater than the target fraction, then more count values than desired are being generated by noise events. In this case, calibrator 416 adjusts threshold 218 upward to reduce the fraction of noise count values. If the calculated fraction is less than the target fraction, then too few count values are being generated by noise events, and calibrator 416 adjusts threshold 218 downward to increase sensitivity to a weaker reflected light pulse. In one embodiment, calibrator 416 adjusts threshold 218 upward or downward by a fixed value independent of the calculated fraction. In another embodiment, calibrator 416 adjusts threshold 218 upward by a first fixed value different from a second fixed value with which calibrator 416 adjusts threshold 218 downward. In other embodiments, calibrator 416 adjusts threshold 218 upward and/or downward based on the calculated fraction. In these embodiments, calibrator 416 may adjust threshold 218, for example, by a value that scales with a difference between the calculated fraction and the target fraction so that the value is large when the calculated fraction is far from the target fraction, and small when the calculated fraction is closer to the target fraction.

By adjusting threshold 218, calibrator 416 essentially closes a feedback loop, wherein threshold 218 converges to an optimal value with each calibration period. Therefore, periodically performing a calibration period helps maintain threshold 218 near an optimal value as noise levels change and components drift.

It should be appreciated that more rapid and accurate convergence to timer calibration values (e.g., count speed) and timeout limits can be obtained if the resources are available to store all of count values 152 and perform statistical processing on the stored count values, such as computing the standard deviation of the timeout count values and using the calculated standard deviation to set lower timeout limit 506 and/or upper timeout limit 504. In this case, updated timeout limits may be applied to the already-acquired count values to reclassify the already-acquired count values and refine the calibration values and/or timeout limits before the next rangefinding period.

Downward Shifting of Threshold During Calibration

If the calibration periods are too short or infrequent, calibrator 416 may not accumulate a statistically-significant number of noise-induced count values when threshold 218 is set to a value appropriate for actual rangefinding (e.g., 1 noise event per million distance measurements). As a result, adjustments to threshold 218 by calibrator 416 may be such that threshold 218 does not converge rapidly enough to the optimal value. In this case, it may be advantageous to shift threshold 218 downward, during each calibration period, to a value at which noise events occur in a larger fraction of count values 152. A larger fraction of noise count values (e.g., more than zero) may then be obtained with fewer count values 152. When rangefinding resumes (i.e., mode selector 412 changes its output state), threshold 218 may then be shifted back upward to the previous value, after which calibrator 416 may then adjust threshold 218 based on the larger fraction of noise count values.

It has been observed that shifting threshold 218 downward during calibration periods is effective because a change in threshold 218 corresponding to a change in noise event probability of, for example, one noise event per million count values to one noise event per ten count values, is often small and constant compared to a change in threshold 218 needed to compensate for changes in ambient light 124, temperature, and other effects.

Combining Fast and Slow Adjusting of the Threshold

In many applications, a level of ambient light 124 changes faster than calibrator 416 can respond, or a calibration period coincides with a changing level of ambient light 124. Therefore, it may be beneficial to combine ambient-light compensator 302 with calibrator 416 to provide fast sub-optimal setting of threshold 218 (via ambient-light compensator 302) with slower, optimal adjustments to threshold 218 (via calibrator 416).

Figure 7:
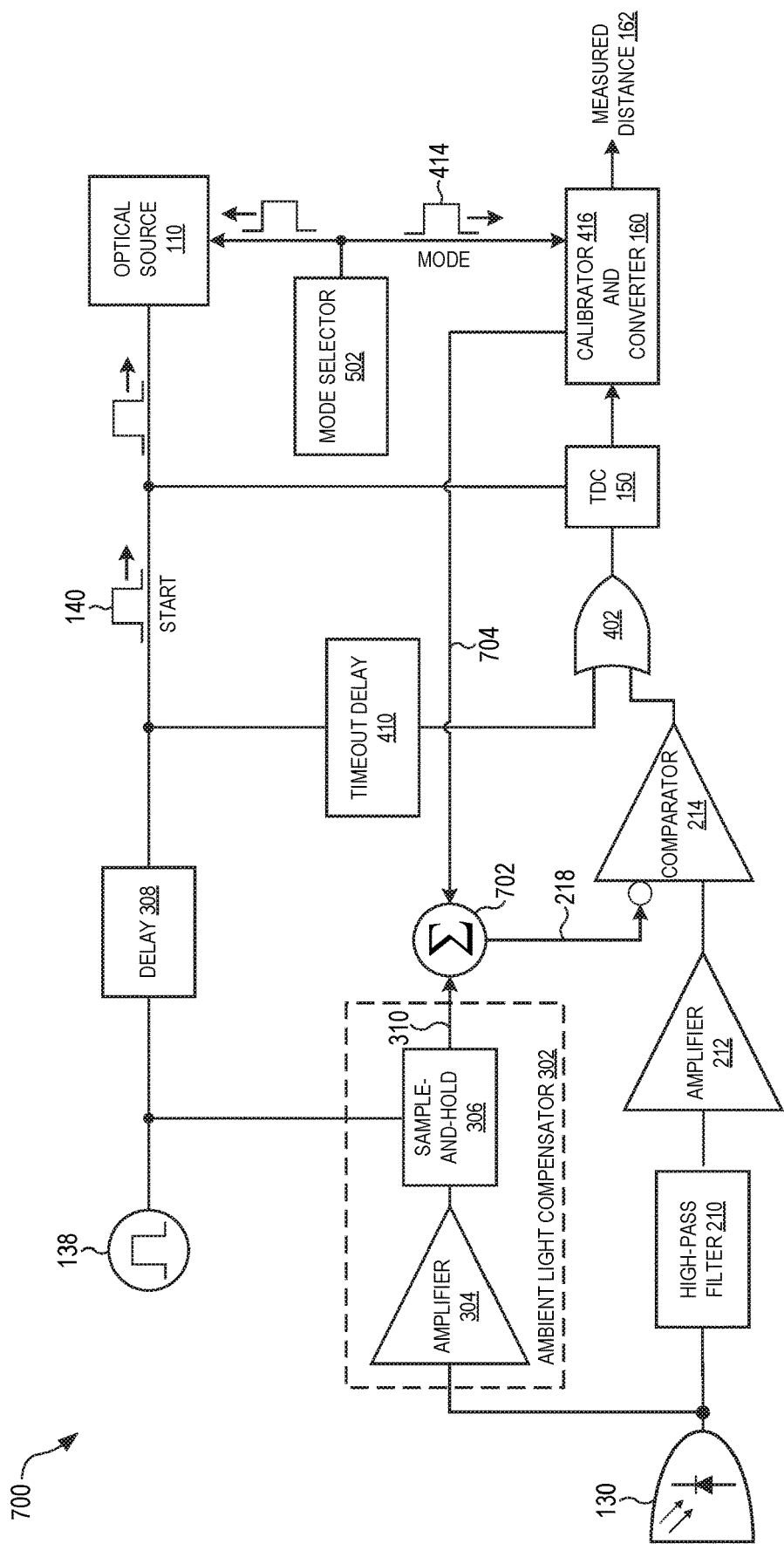
FIG. 7 is a functional diagram of one example optical rangefinder and lidar receiver system that advantageously combines the ambient-light compensator of FIG. 3 with the calibrator of FIG. 4, in embodiments.

FIG. 7 is a functional diagram of one example optical rangefinder and lidar receiver system 700 that advantageously combines ambient-light compensator 302 of FIG. 3 with calibrator 416 of FIG. 4. Adder 702 combines an output of ambient-light compensator 302 (i.e., stored sample 310) and an output 704 of calibrator 416 to generate threshold 218. Adder 702 may be a weighted adder that multiplies each addend by a weight prior to adding. For example, adder 702 may be an op-amp summing amplifier, wherein each addend is weighted according to an input resistor corresponding to said each addend. Adder 702 may also be a nonlinear adder 702 that implements nonlinear operations. For example, nonlinear adder 702 may implement a floor function, wherein nonlinear adder 702 replaces stored sample 310 with a minimum value (not shown in FIG. 7) when stored sample 310 is below the minimum value (e.g., a value known to be necessary to maintain a desired noise-event rate). Thus, in this example, threshold 218 is determined by the minimum value and calibrator output 704, and not stored sample 310.

In FIG. 7, optical source 110 is controlled by both mode trigger 414 and start trigger 140. In the examples presented hereinabove, optical source 110 should only respond to start trigger 140 when mode trigger 414 indicates that receiver system 700 is in the rangefinding mode. When optical source 110 contains only one electronic trigger input, mode trigger 414 and start trigger 140 may be combined (e.g., using one or more logic gates) to obtain a single optical-pulse trigger that generates light-pulse emission from the optical source 110 correctly for both the rangefinding and calibration modes.

Interleaving Calibration Periods

Calibration periods may be performed by the receiver system periodically during operation of the lidar or rangefinding system (e.g., optical rangefinder 100 of FIG. 1), such as when the system is not actively rangefinding and therefore available to perform calibration. Periodic calibration maintains system accuracy as operating conditions change. When calibration is performed for a system that is already relatively accurate (e.g., when operating conditions are stable), timeout count values (i.e., count values 152 from TDC 150 classified as resulting from noise events) are evenly distributed about mean timeout count value 502, with a large fraction of the timeout count values lying close to mean timeout count value 502. It is preferable during each calibration period to verify that the measured fraction of noise count values is close to the target fraction, and that the timeout count values are properly distributed around mean timeout count value 502, ensuring that calibrator 416 does not undesirably shift mean timeout count value 502 based on a random set of unrepresentative count values. This undesirable shift may become significant with small sample sizes of count values and/or rapidly-varying operating conditions (e.g., a rapid change in temperature or large change in ambient light 124).

In several embodiments, the calibration and rangefinding modes are interleaved. Interleaving of modes may be implemented in many ways. For example, one or more calibration periods may be performed upon system power-up, or periodically between one or more periods of rangefinding. In another example, each calibration period obtains a first number of count values 152 from TDC 150 (corresponding to a first number of calibration cycles), and each period of rangefinding obtains a second number of count values 152 from TDC 150. Each of the first number and the second number may be one, such that count values 152 form an alternating sequence of count values for rangefinding and count values for calibration.

In one embodiment, calibrator 416 repeatedly: (1) classifies each count value 152 as a noise count value or timeout count value, and (2) increases threshold 218 if said each count value is a noise count value, and decreases threshold 218 if said each count value is a timeout count value. Calibrator 416 may increase and decrease threshold 218 by the same value, or different values (i.e., a first value for increasing threshold 218 and a second value for decreasing 218). Provided that the changes to threshold 218 are not so large or sudden as to cause oscillations in threshold 218, the fraction of count values that are noise count values will settle to the desired fraction.

Embodiments of the Calibrator

Figure 8:
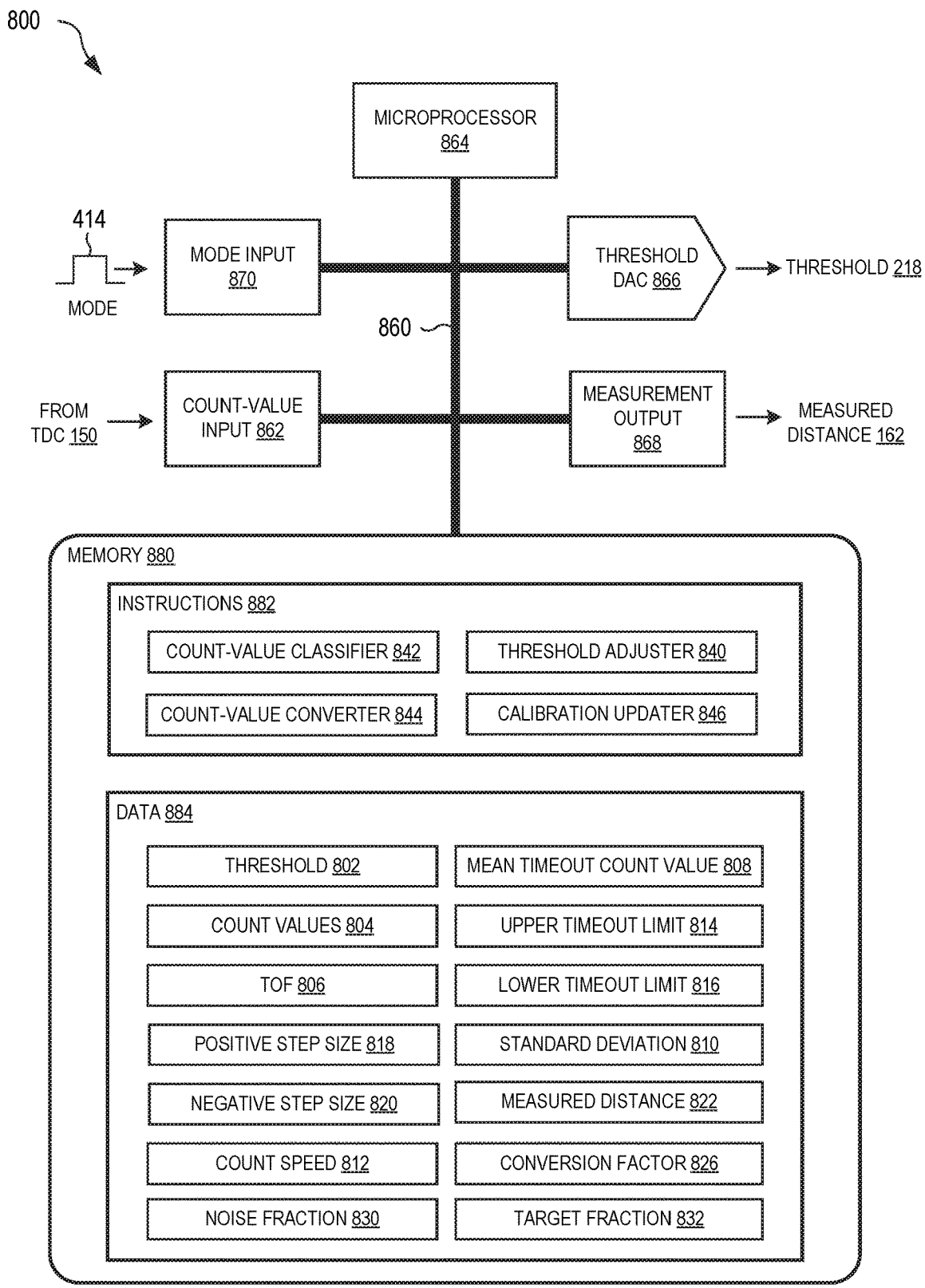
FIG. 8 is a schematic diagram of one example digital calibrator that sets the threshold and calibrates the receiver system by determining the count speed, in embodiments.

FIG. 8 is a schematic diagram of one example digital calibrator 800 that sets threshold 218 and calibrates a receiver system (e.g., receiver system 400 of FIG. 4, or receiver system 700 of FIG. 7) by determining the count speed. Digital calibrator 800 implements functionalities of calibrator 416 and converter 160 in one element, as described previously (see FIGS. 4 and 7). Digital calibrator 800 includes a microprocessor 864 that processes data, a memory 880 that stores data 884 and instructions 882, a mode input 870 that receives mode trigger 414 from mode selector 412, a count-value input 862 that receives count values 152 from TDC 150, a threshold DAC 866 that outputs an analog threshold 218, and a measurement output 868 that communicates measured distance 162. Microprocessor 864, memory 880, mode input 870, count-value input 862, threshold DAC 866, measurement output 868, and other components of digital calibrator 800 are communicatively coupled via a bus 860.

Microprocessor 864 may include at least one central processing unit (CPU), graphics processing unit (GPU), digital signal processor (DSP), field-programmable gate array (FPGA), or other type of integrated circuit capable of performing logic, control, and input/output operations. Microprocessor 864 may include a mixed-signal integrated circuit, such as a System-on-Chip (SoC) or microcontroller unit (MCU), that combines a processor, memory, and input/output interfaces on a single chip. Microprocessor 864 may also include a memory controller, bus controller, graphics processing unit, and/or other components that manage data flow between microprocessor 864, memory 880, and other components communicatively coupled with bus 860.

Memory 880 may include both volatile memory (e.g., RAM, SRAM, etc.) and nonvolatile memory (e.g., ROM, FLASH, etc.). Instructions 882 include machine-readable instructions that, when executed by microprocessor 864, control operation of digital calibrator 800. Instructions 882 may include a threshold adjustor 840, a count-value converter 844, a count-value classifier 842, as well as operating system instructions.

In FIG. 8, data 884 is shown storing a threshold 802, count values 804, a TOF 806, a positive step size 818, a negative step size 820, a count speed 812, a noise fraction 830, a mean timeout count value 808, an upper timeout limit 814, a lower timeout limit 816, a standard deviation 810, a measured distance 822, a conversion factor 826, and a target fraction 832. Count values 804 may be received from count-value input 862 via bus 860.

Microprocessor 864 executes instructions 882 to determine mode trigger 414 with mode input 870 and (i) execute count-value classifier 842, threshold adjuster 840 and/or calibration updater 846 when mode trigger 414 indicates the calibration mode, and (ii) execute count-value converter 844 when mode trigger 414 indicates the rangefinding mode.

Count-value classifier 842 controls microprocessor 864 to identify each of count values 804 as being one of: a noise count value originating from a noise event, and a timeout count value originating from a timeout. For example, count-value classifier 842 may control microprocessor 864 to classify one of count values 804 as being a noise count value when said one of count values 804 is less than lower timeout limit 816. Similarly, count-value classifier 842 may control microprocessor 864 to classify one of count values 804 as being a timeout count value when said one of count values 804 is greater than lower timeout limit 816 and less than upper timeout limit 814. Count-value classifier 842 may control microprocessor 864 to store the classifications with count values 804 in data 884 to aid execution of threshold adjustor 840 and/or calibration updater 846.

Threshold adjustor 840 controls microprocessor 864 to adjust threshold 802 based on count values 804 that were classified as noise count values, and control threshold DAC 866 to output analog threshold 218 according to threshold 802. For example, threshold adjustor 840 may control microprocessor 864 to calculate noise fraction 830 from the noise count values, and to increase threshold 802 by positive step size 818 when noise fraction 830 is greater than target fraction 832. Similarly, threshold adjustor 840 may control microprocessor 864 to decrease threshold 802 by negative step size 820 when noise fraction 830 is less than target fraction 832.

Calibration updater 846 controls microprocessor 864 to determine mean timeout count value 808 and/or standard deviation 810 using count values 804 that were classified as timeout count values, and update upper timeout limit 814 and/or lower timeout limit 816 according to mean timeout count value 804 and/or standard deviation 810. For example, calibration updater 846 may control microprocessor 864 to store in lower timeout limit 816 a value of mean timeout count value 808 less twice a value of standard deviation 810. Calibration updater 846 may also control microprocessor 864 to update count speed 812 according to mean timeout count value 808.

Count-value converter 844 controls microprocessor 864 to calculate TOF 806 from any one of count values 804. For example, count-value converter 844 may control microprocessor 864 to divide said one of count values 804 by count speed 812 to obtain TOF 806. Count-value converter 844 may also control microprocessor 864 to calculate measured distance 822 from TOF 806. For example, count-value converter 844 may control microprocessor 864 to multiply TOF 806 by conversion factor 826 to obtain measured distance 822. Count-value converter 844 may also control microprocessor 864 to control measurement output 868 to output measured distance 822 and/or TOF 806.

Figure 9:
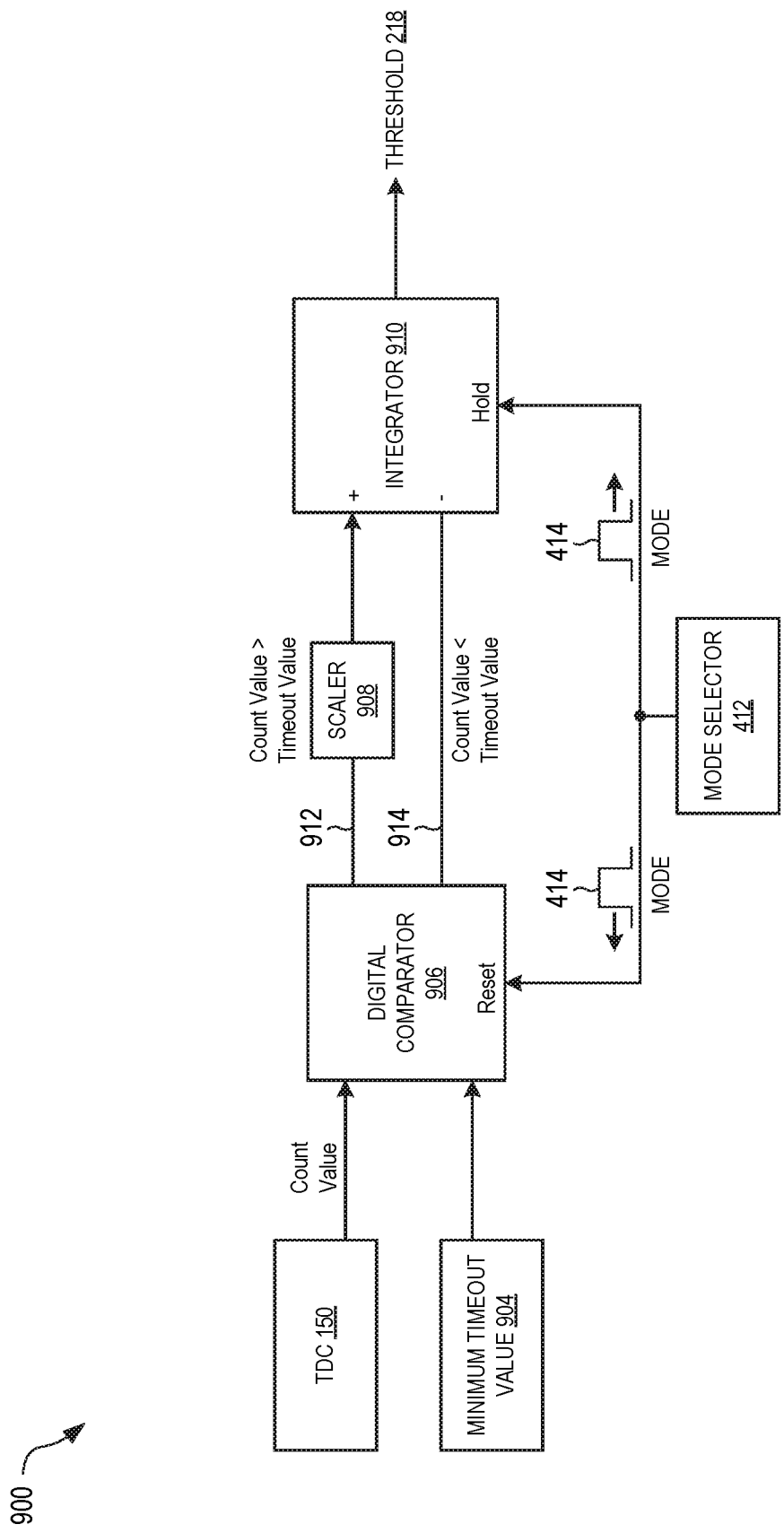
FIG. 9 is a schematic diagram of one example threshold adjustor that adjusts the threshold based on noise count values, in an embodiment.

FIG. 9 is a schematic diagram of one example threshold adjustor 900 that adjusts threshold 218 based on noise count values. Threshold adjustor 900 is an all-hardware alternative to threshold-adjusting functionality of digital calibrator 800 (i.e., threshold adjustor 840), and may form part of calibrator 416 (see FIGS. 4 and 7). During calibration, as determined by mode trigger 414, a digital comparator 906 compares count values 152 from TDC 150 to a minimum timeout value 904. When one of count values 152 is greater than minimum timeout value 904, digital comparator 906 outputs a first signal on a first signal line 912 to indicate that said one of count values 152 is a timeout count value. When one of count values 152 is less than minimum timeout value 904, digital comparator 906 outputs a second signal on second signal line 914 to indicate that said one of count values 152 is a noise count value. Each of first signal line 912 and second signal line 914 is a digital logic line. Thus, for each of the pulses, one of the first and second signal lines 912, 914 goes high. An integrator 910 integrates the first and second signals, increasing threshold 218 if the count value was a noise count value and reducing threshold 218 if the count value was a timeout count value. These adjustments to threshold 218 change the ratio of the number of timeout count values to the number of noise count values such that the ratio converges to a desired ratio. One or both of the first and second signals may be scaled (e.g., with a scaler 908, as shown in FIG. 9) to change the desired ratio. For example, if scaler 908 has a scale-factor of unity, then threshold 218 will converge to a level such that 50% of the timeout count values will be classified as noise count values.

Methods

Figure 10:
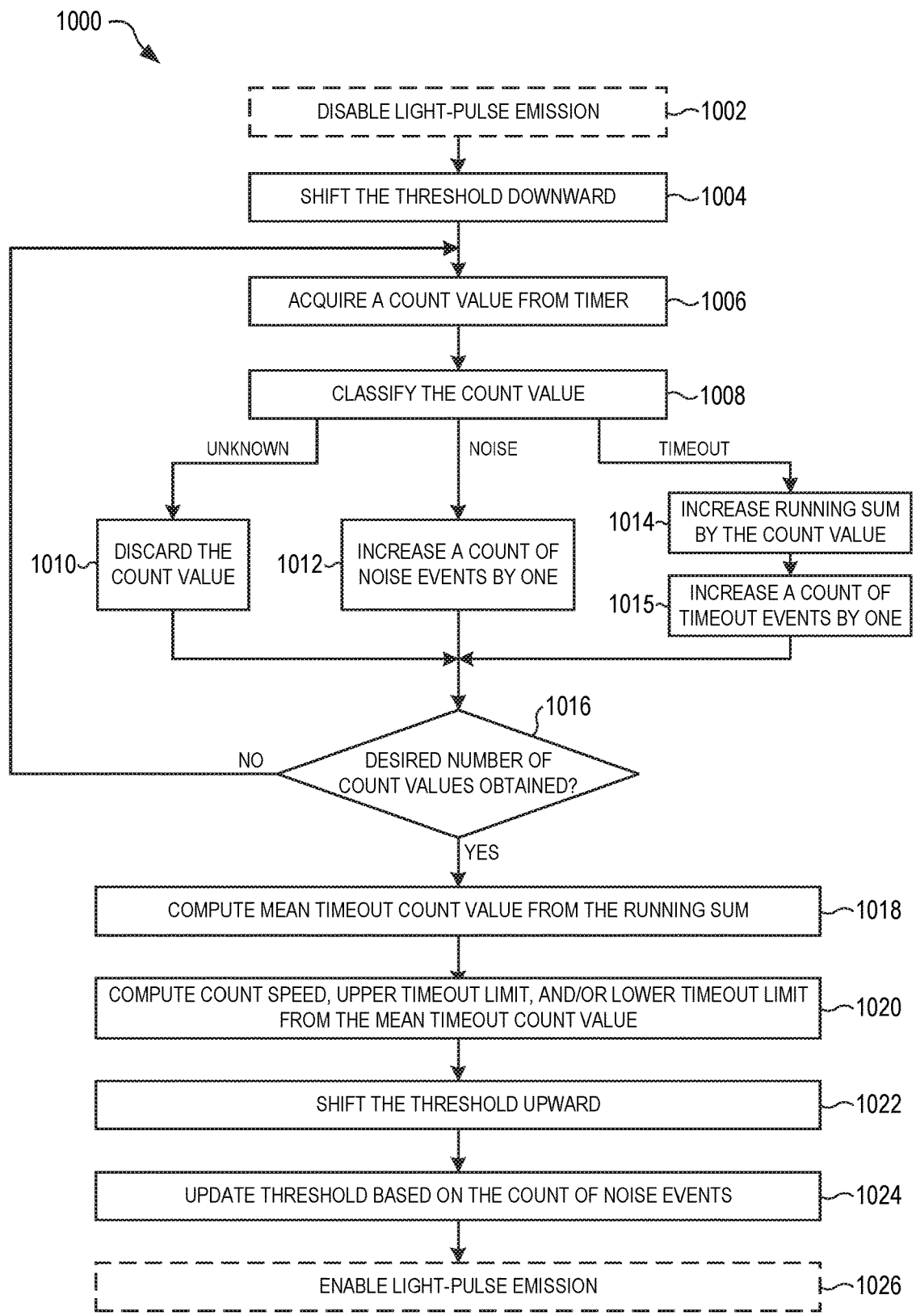
FIG. 10 is a flowchart showing one example method that calibrates and adjusts a threshold of a lidar and/or rangefinder receiver, in embodiments.

FIG. 10 is a flowchart showing one example method 1000 that calibrates and adjusts a threshold of a lidar and/or rangefinder receiver. Method 1000 corresponds to one calibration period, as described previously, and may be performed by calibrator 416 of receiver system 400 of FIG. 4 and/or receiver system 700 of FIG. 7. Method 1000 may also be performed by digital calibrator 800 of FIG. 8.

Method 1000 includes a step 1004 to shift the threshold downward. In one example of step 1004, calibrator 416 shifts threshold 218 downward from an initial threshold value to increase a relative number of noise count values (i.e., calibration cycles that were stopped by noise events).

Method 1000 iterates over steps 1006, 1008, 1010, 1012, 1014, 1015, and 1016 until a desired number of count values is obtained. Step 1006 acquires one count value from a timer. In one example of step 1006, calibrator 416 obtains one count value 152 from TDC 150. Step 1008 classifies the one count value as being one of a timeout count value, a noise count value, and an unknown count value. If step 1008 classifies the one count value as a timeout count value, step 1014 increases a running sum by the timeout count value and step 1015 increases a count of timeout events by one. If step 1008 classifies the one count value as a noise count value, step 1012 increases a count of noise events. If step 1008 classifies the one count value as an unknown count value, step 1010 discards the unknown count value. Step 1016 checks if the desired number of count values has been obtained. If step 1016 determines too few count values have been obtained, method 1000 goes back to step 1006 to obtain an additional count value. In one example of steps 1006, 1008, 1010, 1012, 1014, 1015, and 1016, digital calibrator 800 of FIG. 8 receives count values 804 from TDC 150 via count-value input 862, and count-value classifier 842 controls microprocessor 846 to classify count values 804.

If step 1016 determines that the desired number of count values has been obtained, method 1000 continues to a step 1018 to compute a mean timeout count value from the running sum and the count of timeout events. In one embodiment, step 1018 computes the mean timeout count value by dividing the running sum by the count of timeout events. In one example of step 1018, calibration updater 846 of digital calibrator 800 controls microprocessor 864 to determine mean timeout count value 808 using count values 804 that were classified as timeout count values.

Method 1000 also includes a step 1020 to compute a count speed, upper timeout limit, and/or a lower timeout limit from the mean timeout count value. In one example of step 1020, calibration updater 846 of digital calibrator 800 controls microprocessor 864 to update upper timeout limit 814 and/or lower timeout limit 816 according to mean timeout count value 808. In another example of step 1020, calibration updater 846 controls microprocessor 864 to update count speed 812 according to mean timeout count value 808.

Method 1000 also includes a step 1022 to shift the threshold upward to the value prior to step 1024. In one example of step 1022, calibrator 416 shifts threshold 218 upward to return threshold 218 to the initial threshold value.

Method 1000 also includes a step 1024 to update the threshold based on the count of noise events and/or the desired number of count values obtained. In one embodiment, step 1024 calculates a fraction of noise events by dividing the count of noise events by the desired number of count values, and updates the threshold based on the calculated fraction of noise events. In one example of step 1024, threshold adjustor 840 of digital calibrator 800 controls microprocessor 864 to (i) calculate noise fraction 830 from a number of noise count values, (ii) increase threshold 802 by positive step size 818 when noise fraction 830 is greater than target fraction 832, and (iii) decrease threshold 802 by negative step size 820 when noise fraction 830 is less than target fraction 832. The number of noise count values may be zero. In another example of step 1024, threshold adjustor 840 controls 864 to control threshold DAC 866 to output analog threshold 218 according to threshold 802. In one embodiment, steps 1022 and 1024 cooperate as one step to update the threshold once.

In one embodiment, method 1000 includes a step 1002 to disable light-pulse emission prior to step 1004, and a step 1026 to enable light-pulse emission after step 1024. In one example of step 1002, mode selector 412 indicates the calibration mode by outputting mode trigger 414 to disable light-pulse emission from optical source 110. In one example of step 1004, mode selector 412 switches from the calibration mode to the rangefinding mode by switching a state of mode trigger 414 to enable light-pulse emission from optical source 110.

Figure 11:
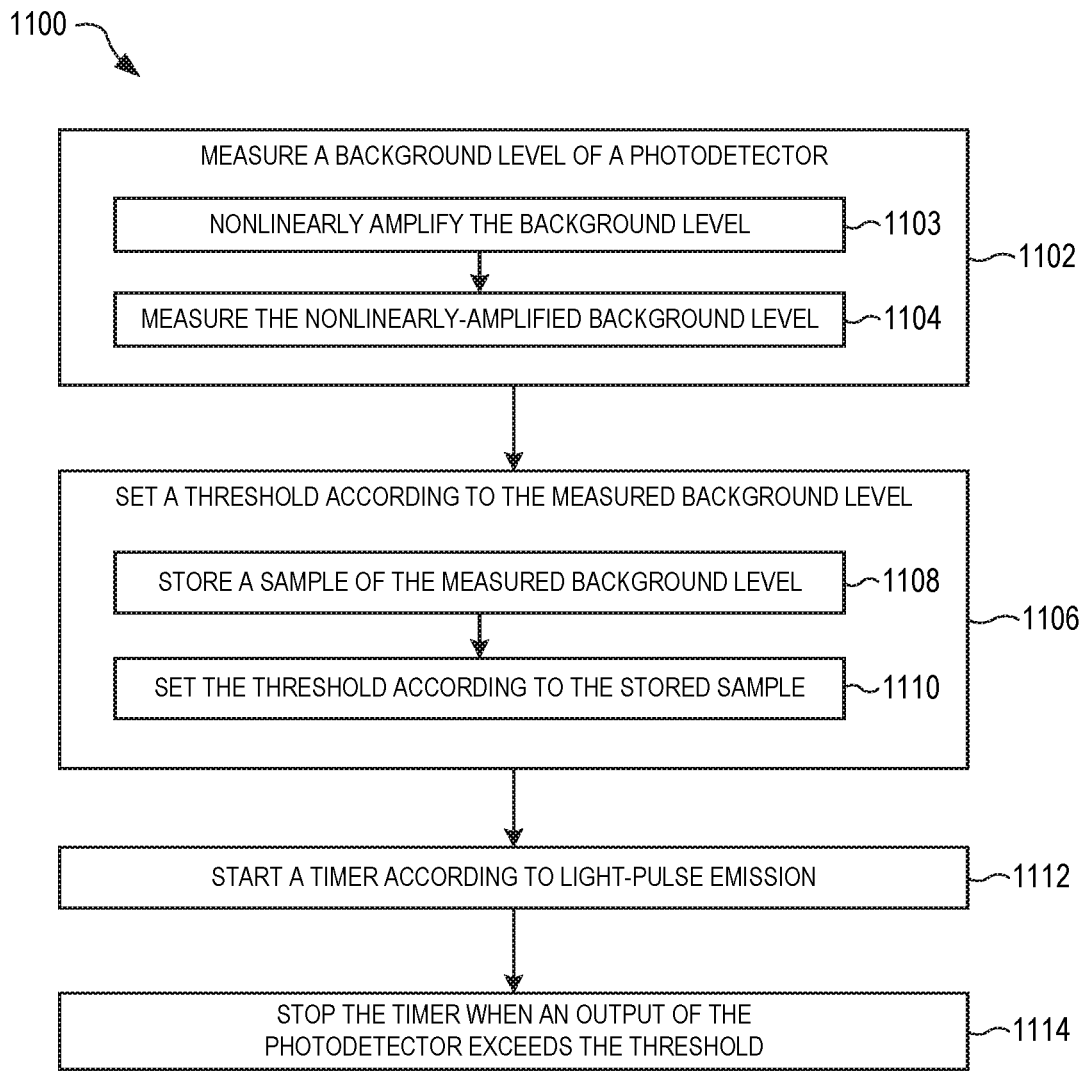
FIG. 11 is a flowchart showing one example method that compensates for ambient light detected by a lidar and/or rangefinder receiver, in embodiments.

FIG. 11 is a flowchart showing one example method 1100 that compensates for ambient light detected by a lidar and/or rangefinder receiver. Method 1100 may be performed by ambient-light compensator 302 of receiver system 300 of FIG. 3 and/or receiver system 700 of FIG. 7. Method 1100 includes a step 1102 to measure a background level of a photodetector. In one example of step 1102, ambient-light compensator 302 measures photodetector signal 132 to measure a background level of photodetector 130. Method 1100 also includes a step 1106 to set a threshold according to the measured background level. In one embodiment, step 1106 includes a step 1108 to store a sample of the measured background level and a step 1110 to set the threshold according to the stored sample. In one example of steps 1106, 1108, and 1110, sample-and-hold circuit 306 enters a hold mode to store a sample 310 of the background level and output sample 310 as threshold 218. Method 1100 also includes a step 1112 to start a timer according to light-pulse emission from an optical source. In one example of step 1112, delay 308 outputs start trigger 140 that simultaneously starts TDC 150 and controls optical source 110 to emit one light pulse 112. In another example of step 1112, a timing circuit starts TDC 150 at a first time and controls optical source 110 to emit one light pulse 112 at a second time different than the first time. Method 1100 also includes a step 1114 to stop the timer when an output of the photodetector exceeds the threshold. In one example of step 1114, comparator 214 outputs stop trigger 136 when amplified AC signal 204 is greater than threshold 218.

In one embodiment, step 1110 outputs the stored sample continuously between steps 1106 and 1112 so that the threshold remains set while photodetector 130 detects one reflected light pulse. In another embodiment, steps 1108 and 1110 occur while the photodetector is not detecting the light-pulse emission from the optical source, so that step 1108 samples a background level of the photodetector. In another embodiment, the light-pulse emission forms a light-pulse train, and steps 1108 and 1110 occur once for each period of the light-pulse train, beginning when the photodetector is not detecting the light-pulse emission. That is, steps 1108 and 1110 occur once between each consecutive pair of light pulses form the light-pulse train.

In some embodiments, step 1102 of method 1100 includes a step 1103 to nonlinearly amplify the background level of the photodetector, and a step 1104 to measure the nonlinearly-amplified background level of the photodetector. In one of these embodiments, step 1103 square-root amplifies the background level of the photodetector to produce a nonlinearly-amplified background level. In one example of steps 1103 and 1104, amplifier 304 nonlinearly amplifies photodetector signal 132 to obtain the nonlinear-amplified background level, wherein sample-and-hold circuit 306 stores a sample 310 of the nonlinear-amplified background level and outputs sample 310 of the nonlinear-amplified background level to form threshold 218.

Figure 12:
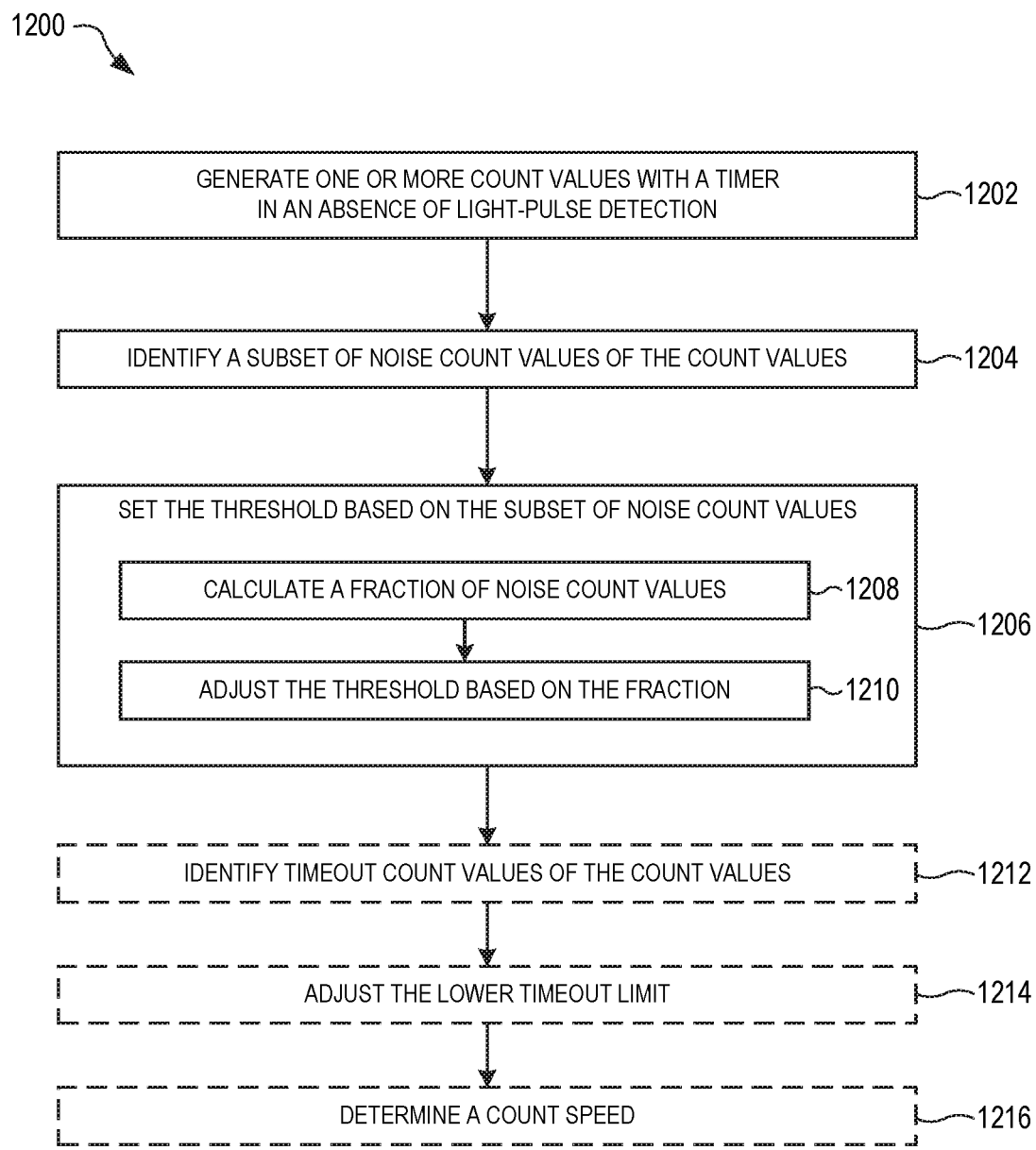
FIG. 12 is a flowchart showing one example method that calibrates and adjusts a threshold of a lidar and/or rangefinder receiver, in embodiments.

FIG. 12 is a flowchart showing one example method 1200 that calibrates and adjusts a threshold of a lidar and/or rangefinder receiver. Method 1200 may be performed by calibrator 416 of receiver system 400 of FIG. 4 and/or receiver system 700 of FIG. 7. Method 1200 includes a step 1202 to generate one or more count values with a timer in an absence of light-pulse detection, each of the one or more count values indicative of a time interval between a start trigger and a stop trigger, the stop trigger resulting from one of a noise event and a timeout. In one example of step 1202, TDC 150 generates a count value corresponding to a time interval between a start trigger 140 (see $t_i$ in FIGS. 5 and 6) and a stop trigger 136 (see $t_f$ in FIGS. 5 and 6), wherein mode selector 412 disables light-pulse emission from optical source 110, and stop trigger 136 is generated by either timeout trigger 404 or when comparator 214 switches output states in response to a noise event. In one embodiment, method 1100 also includes a step to generate a timeout trigger from the start trigger according to the timeout, wherein the timeout trigger forms the stop trigger in response to the timeout.

Method 1200 also includes a step 1204 to identify a subset of noise count values of the one or more count values. The subset may include the null set, wherein step 1204 identifies zero noise count values. In one example of step 1204, compensator 416 identifies a count value as a noise count value when the count value is less than lower threshold limit 506 (see FIG. 6). Method 1200 also includes a step 1206 to set the threshold based on the subset of noise count values. In one embodiment, step 1206 includes a step 1208 to calculate a fraction of the one or more count values that are the noise count values, and a step 1210 to adjust the threshold based on the fraction. In one example of steps 1206, 1208, and 1210, threshold adjustor 840 of digital calibrator 800 controls microprocessor 864 to calculate noise fraction 830 from noise count values, and to increase threshold 802 by positive step size 818 when noise fraction 830 is greater than target fraction 832. Similarly, threshold adjustor 840 may control microprocessor 864 to decrease threshold 802 by negative step size 820 when noise fraction 830 is less than target fraction 832.

In some embodiments, method 1200 includes a step 1212 to identifying each of the one or more count values as one or more timeout count values when said each of the one or more count values is greater than a lower timeout limit. In one example of step 1212, count-value classifier 842 controls microprocessor 864 to classify one of count values 804 as being a timeout count value when said one of count values 804 is greater than lower timeout limit 816. In one of these embodiments, method 1200 includes a step 1212 to adjust the lower timeout limit based on a mean of the one or more timeout count values. In one example of step 1212, calibration updater 846 of digital calibrator 800 controls microprocessor 864 to determine mean timeout count value 808 using count values 804 that were classified as timeout count values. In another of these embodiments, method 1200 includes a step 1216 to determine a count speed from the mean of the one or more timeout count values. In one example of step 1216, calibration updater 846 of digital calibrator 800 controls microprocessor 864 to update count speed 812 according to mean timeout count value 808.

Demonstrations

Figure 13:
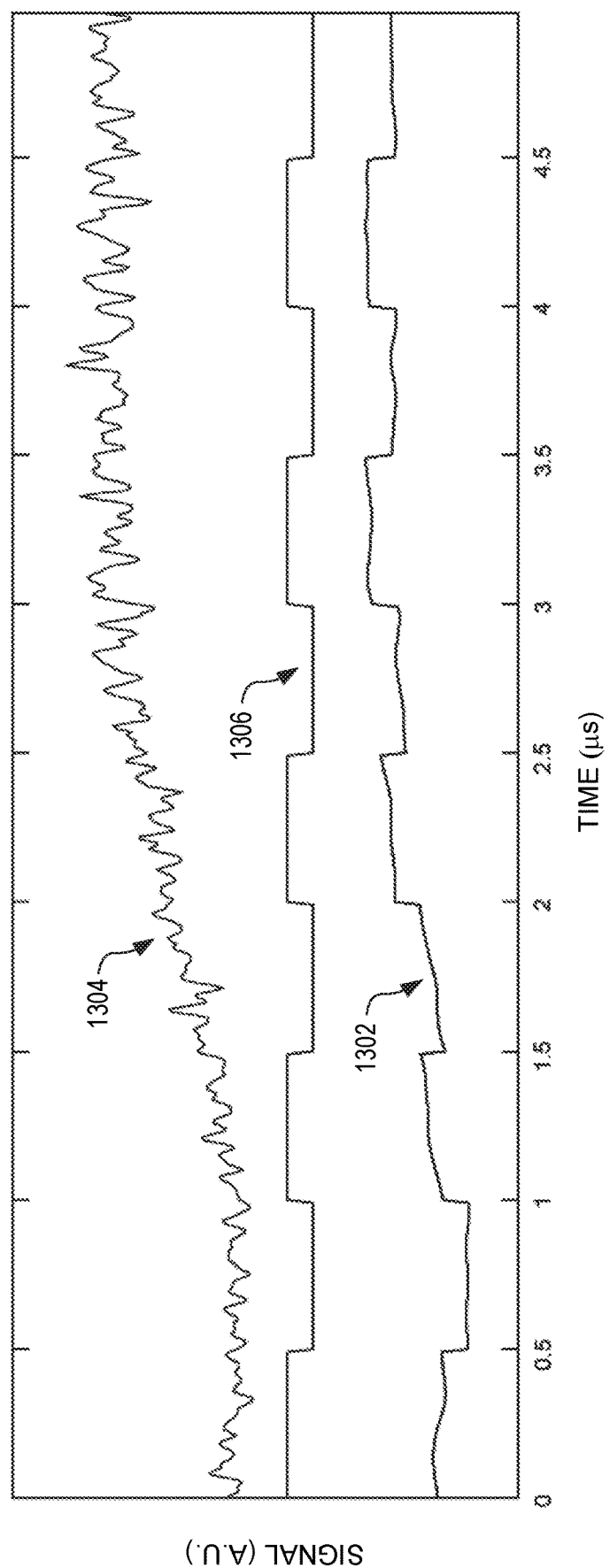
FIG. 13 is a plot of a threshold signal, an ambient-light signal, and a calibration threshold shift over a period of time during which ambient light is changed hypothetically, in an embodiment.

FIG. 13 is a plot of a threshold signal 1302, an ambient-light signal 1304, and a calibration threshold shift 1306 over a period of time during which ambient light 124 is changed hypothetically. Ambient-light signal 1304 includes noise due to ambient light 124 (e.g., shot noise). Calibration threshold shift 1306 switches been high and low values, corresponding to rangefinding and calibration modes, respectively. Thus, FIG. 13 shows five rangefinding periods interspersed by five calibration periods (each calibration period including one or more calibration cycles). Threshold signal 1302 shifts up and down synchronously with calibration threshold shift 1306. However, threshold signal 1302 also drifts upward in time similarly to ambient-light signal 1304. The increase in threshold signal 1302 accounts for an increase in noise due to the increase in ambient-light signal 1304.

Figure 14:
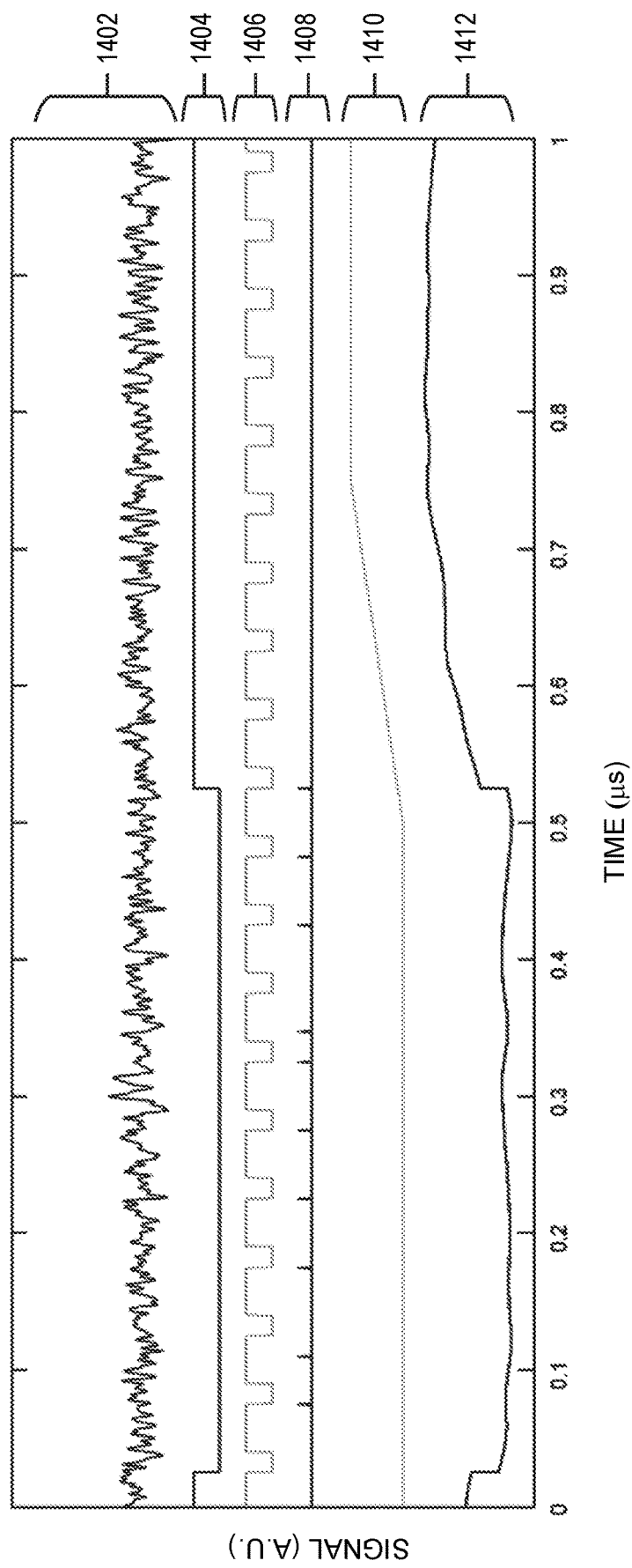
FIG. 14 is a plot of an ambient-light signal, a calibration threshold shift, a precision calibration trigger signal, a trigger event signal, a threshold adjustment, and a band-width-limited threshold, over a period of time during which ambient light is changed hypothetically, in an embodiment.

FIG. 14 is a plot of an ambient-light signal 1402, a calibration threshold shift 1404, a precision calibration trigger signal 1406, a trigger event signal 1408, a threshold adjustment 1410, and a bandwidth-limited threshold 1412, over a period of time during which ambient light 124 is changed hypothetically. FIG. 14 shows one calibration period that begins at 0.025 µs, as indicated by the downward step in calibration threshold shift 1404 at this time. Each pulse of precision calibration trigger signal 1406 corresponds to one calibration cycle, and thus the calibration period illustrated in FIG. 14 has ten calibration cycles.

When calibration threshold shift 1404 steps upward at 0.525 µs, the calibration period is over and active rangefinding resumes. In rangefinding mode, each pulse of precision calibration trigger signal 1406 corresponds to one optical pulse 112 emitted by optical source 110. Thus, the rangefinding period in FIG. 10 shows nine complete rangefinding cycles after the calibration period.

In FIG. 14, each of the second and seventh calibration cycles was stopped by a noise event, as indicated by a trigger event of trigger event signal 1408 occurring before an end of the corresponding pulse of precision calibration trigger signal 1406. These two calibration cycles result in noise count values. The remaining eight calibration cycles were stopped by timeout pulses, and thus correspond to timeout count values. The corresponding noise fraction of the ten calibration cycles is 0.2. Assuming the target fraction is 0.1, threshold adjustment 1410 may be increased to reduce the noise fraction toward the target fraction, as shown in FIG. 14 between 0.5 and 0.75 µs.

Embodiments without a Timer

Figure 15:
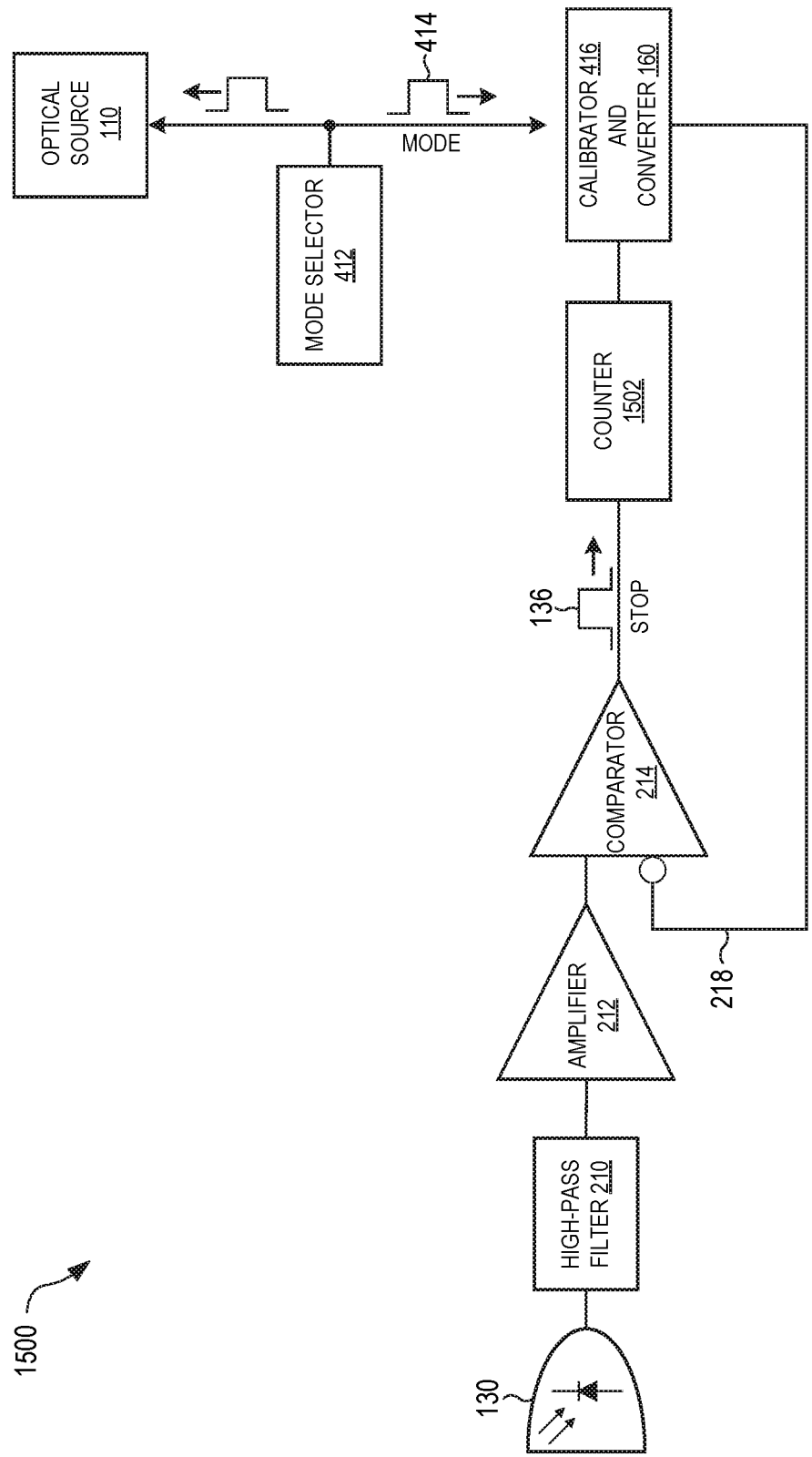
FIG. 15 is a functional diagram of one example optical rangefinder and lidar receiver system that sets the threshold without a timer, in embodiments.

FIG. 15 is a functional diagram of one example optical rangefinder and lidar receiver system 1500 that sets threshold 218 without a timer (e.g., TDC 150). Receiver system 1500 includes a digital counter 1502 that counts stop triggers 136 outputted by comparator 214 to determine a number of noise events during a calibration period of a known duration. After the duration has expired, calibrator 416 may divide the number of noise events by the duration to obtain a noise-event rate. Calibrator 416 may then compare the noise-event rate to a target rate, and raise or lower threshold 218 based on the comparison. For example, if the noise-event rate is greater than the target rate, calibrator 416 may raise threshold 218 to reduce the noise-event rate. Similarly, if the noise-event rate is less than the target rate, calibrator 416 may lower threshold 218 to increase the noise-event rate. Thus, these embodiments effectively form a feedback loop that adjusts threshold 218 so that the noise-event rate converges to the target rate, thereby ensuring that threshold 218 is optimally set. Although not shown in FIG. 15, counter 1502 may also receive mode trigger 414 to reset at the beginning of the calibration period. While FIG. 15 shows counter 1502 as a separate component from calibrator 416, the functionality of counter 1502 may be directly incorporated into calibrator 416, wherein stop triggers 136 are counted directly by calibrator 416.

Accordingly, the output of comparator 214 indicates an arrival of a signal pulse. In one embodiment, a phase detector receives the output of comparator 214 to identify the point in a light-pulse cycle at which comparator 214 transitions. In this embodiment, optical rangefinder 100 may record immediately when a signal arrives.

Embodiments presented herein may be implemented in a variety of ways, such as in electronic hardware, in software executing on a microprocessor or DSP, in a hybrid form (e.g., an FPGA, ASIC, programmable logic), or a combination thereof. The choice of implementation may be made without significantly affecting the concepts presented here, which are applicable to a variety of single-point or array-based lidar systems in which scanning is performed by mechanical, optical, electromagnetic, or other means, and to single-point systems or multipoint array systems that do not incorporate scanning but may be subject to variations in ambient light and other noise sources due to external dynamic conditions.

For example, while the above implementation is described primarily in hardware terminology, in a software or programmable logic approach to pulse detection and ambient-light measurement, the output of photodetector 130 may be sampled before significant amplification and perhaps before AC decoupling of the photodetector signal 132, typically at 1 GHz or more, and the comparison operations and compensation for the effects of ambient light 124 may be embedded in software or programmable logic algorithms with significant digital filtering and processing. This does not affect the principles described herein or the benefit of the measurement of ambient light on a cycle-by-cycle basis.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A receiver for a lidar system, comprising:
   a comparator that compares an output of a photodetector of the lidar system to a threshold;
   a timer that generates one or more count values during a calibration period, each of the one or more count values indicating a time interval between a start trigger and a read trigger, the read trigger resulting from one of (i) a timeout and (ii) an output of the comparator; and
   a calibrator that (i) identifies, from the one or more count values, a set of noise count values for which the read trigger resulted from the output of the comparator, and (ii) sets the threshold based on the set of noise count values.

2. The lidar receiver of claim 1, further comprising a timeout delay circuit that generates a timeout trigger delayed from the start trigger by a timeout delay, wherein the timeout trigger is the read trigger when a timeout occurs.

3. The lidar receiver of claim 1, wherein the calibrator:
   calculates a fraction of the one or more count values that are the noise count values,
   increases the threshold when the fraction is greater than a target fraction, and
   decreases the threshold when the fraction is less than the target fraction.

4. The receiver of claim 1, further comprising an ambient-light compensator that measures a background level of the output of the photodetector and further sets the threshold based on the background level.

5. The receiver of claim 4, the ambient-light compensator including a sample-and-hold circuit that stores a sample of the background level and sets the threshold based on the sample.

6. The receiver of claim 5, further comprising a timing circuit that controls the sample-and-hold circuit to (i) obtain the sample when the photodetector does not detect any light pulse emitted by the lidar system and (ii) output the sample while the photodetector detects one or more light pulses emitted by the lidar system.

7. The receiver of claim 1, wherein the calibrator, during the calibration period, shifts the threshold to increase the set of noise count values.

8. The receiver of claim 1, further comprising a mode selector that signals the calibration period to the calibrator.

9. The receiver of claim 8, wherein the mode selector outputs a mode trigger that signals the calibration period to an optical source of the lidar system.

10. The receiver of claim 1, further comprising the photodetector.

11. A receiving method for a lidar system, comprising:
    comparing the output of a photodetector of the lidar system to a threshold;
    generating, with a timer, one or more count values during a calibration period, each of the one or more count values indicating a time interval between a start trigger and a read trigger, the read trigger resulting from one of (i) a timeout and (ii) an output of the comparator;
    identifying, from the one or more count values, a set of noise count values for which the read trigger resulted from the output of the comparator; and
    setting the threshold based on the set of noise count values.

12. The receiving method of claim 11, further comprising generating a timeout trigger that is delayed from the start trigger by a timeout delay, wherein the timeout trigger is the read trigger when a timeout occurs.

13. The receiving method of claim 12, wherein said setting the threshold includes:
    calculating a fraction of the one or more count values that are the noise count values; and
    adjusting the threshold based on the fraction.

14. The receiving method of claim 11, further comprising:
    identifying one or more timeout count values from the one or more count values, each of the one or more timeout count values being greater than a lower timeout limit; and
    determining a count speed based on the one or more timeout count values.

15. The receiving method of claim 11,
    further comprising measuring a background level of the output of the photodetector;
    wherein said setting includes setting the threshold based on the background level.

16. The receiving method of claim 15, wherein:
    said measuring includes storing, with a sample-and-hold circuit, a sample of the background level; and
    said setting includes setting the threshold based on the sample.

17. The receiving method of claim 16, further comprising controlling the sample-and-hold circuit to (i) obtain the sample when the photodetector does not detect any light pulse emitted by the lidar system and (ii) output the sample while the photodetector detects one or more light pulses emitted by the lidar system.

18. The receiving method of claim 16,
further comprising nonlinearly amplifying the background level into a nonlinearly-amplified background level;
wherein the sample-and-hold circuit obtains the sample from the nonlinearly-amplified background level.

19. The receiving method of claim 11, further comprising shifting the threshold during the calibration period to increase the set of noise count values.

20. The receiving method of claim 11, further comprising controlling an optical source of the lidar system to not emit light pulses during the calibration period.

* * * * *